(12) United States Patent
Ahmadi

(10) Patent No.: US 11,403,583 B2
(45) Date of Patent: Aug. 2, 2022

(54) COMPUTER SYSTEM METHOD OF OPTIMIZING MATCHING AND DISPATCH OF CARGO AND TRANSPORT-UNIT BASED ON INDIVIDUAL TRANSPORT-UNIT AND ITS ELEMENTS QUALITY

(71) Applicant: Peyman Ahmadi, Jerome, ID (US)

(72) Inventor: Peyman Ahmadi, Jerome, ID (US)

( * ) Notice: Subject to any disclaimer, the term of this patent is extended or adjusted under 35 U.S.C. 154(b) by 667 days.

(21) Appl. No.: 15/167,248

(22) Filed: May 27, 2016

(65) Prior Publication Data

US 2017/0344932 A1    Nov. 30, 2017

(51) Int. Cl.
  *G06Q 10/08*    (2012.01)
  *G06Q 50/18*    (2012.01)
  *G06Q 30/02*    (2012.01)

(52) U.S. Cl.
  CPC ....... *G06Q 10/083* (2013.01); *G06Q 30/0282* (2013.01); *G06Q 50/188* (2013.01)

(58) Field of Classification Search
  CPC ............... G06Q 50/188; G06Q 10/083; G06Q 10/0831; G06Q 10/0832; G06Q 10/0833; G06Q 10/0834; G06Q 10/08345; G06Q 10/0835; G06Q 10/08355; G06Q 30/08
  USPC .......................................... 705/37, 330–338
  See application file for complete search history.

(56) References Cited

U.S. PATENT DOCUMENTS

| | | | |
|---|---|---|---|
| 7,385,529 B2 | 6/2008 | Hersh | |
| 8,452,713 B2 | 5/2013 | Stemple | |
| 2003/0023538 A1* | 1/2003 | Das | G06Q 30/08 705/37 |
| 2006/0111929 A1* | 5/2006 | Poole | G06Q 10/0832 705/1.1 |
| 2008/0235147 A1* | 9/2008 | Jensen | G06Q 10/08 705/80 |
| 2009/0094084 A1 | 4/2009 | Rempel | |
| 2009/0144074 A1* | 6/2009 | Choi | G06Q 30/012 705/342 |
| 2009/0254971 A1* | 10/2009 | Herz | G06Q 30/0603 726/1 |
| 2011/0153513 A1 | 6/2011 | Erie | |
| 2013/0117142 A1 | 5/2013 | Thompson | |
| 2016/0104110 A1 | 4/2016 | Jones | |

* cited by examiner

*Primary Examiner* — Igor N Borissov

(57) ABSTRACT

Electronic methods and system of matching, negotiation, dispatching and rating for cargo and cargo carrier based on individual transport unit and its elements quality wherein a carrier send an offer from associated unit account. Shipper could rate a transport unit or its individual element accordingly and further able to trace and reject an individual unit-element regardless of association to new unit or carrier. System further assists shippers and carriers by conducting offer generation, management, negotiation and dispatch on behalf of users. System grades offers based on unit qualities and generate offers based on user instruction by applying variable determining factors. Additionally system provides retractable conditional offer capability and delay analyzer assistance prior to negotiation and after dispatch.

73 Claims, 20 Drawing Sheets

FIG. 4

Carrier Quality Table — 80

| | Customer Service Rating (0 - 100) | Overall Carrier Rating (0 - 100) |
|---|---|---|
| Carrier 1 | 50 | 89 |
| carrier 2 | 45 | 75 |

81 — Customer Service Rating
82 — Overall Carrier Rating

FIG. 5

Transport-Unit Quality Table — 90

| | Assigned dispatch speed set by carrier (0-1200 miles/day) | Computed Dispatch Speed (0 - 1200 miles/day) | Liability insurance (0 - 1M dollars) | Cargo Insurance (0 - 1M dollars) | Customer rating (0-100) | Overall Unit Rating (0 - 100) |
|---|---|---|---|---|---|---|
| Unit 1 | 700 | 600 | $1M | $75K | 80 | 98 |
| Unit 2 | 950 | 1000 | $1M | $75K | 60 | 75 |

96 — Assigned dispatch speed set by carrier
91 — Computed Dispatch Speed
92 — Liability insurance
93 — Cargo Insurance
94 — Customer rating
95 — Overall Unit Rating

Equipment Quality Table — 100

| | Equipment Age (1-20 years) — 101 | Reported breakdown history under load for last 6-month (0 - 30) — 102 | Feedback Rating (0-100) — 103 | Overall Equipment Rating (0 - 100) — 104 |
|---|---|---|---|---|
| Tractor 1 | 1 | 0 | | 98 |
| Tractor 2 | 3 | 0 | | 89 |
| Trailer 1 | 5 | 0 | | 80 |
| Trailer 2 | 6 | 1 | | 75 |

FIG. 6

Driver Quality Table — 110

| | Years of Experience (0 -20 years) — 111 | Auto-transport experience (0 - 20 month) — 112 | Reported Late Arrivals per Month (0 - 30) — 113 | safety score (0-100) — 114 | Feedback Rating (0-100) — 115/116 | Number of Accidents for last 2 years (0-10) — 117 | Overall Element Rating (0 - 100) — 118 |
|---|---|---|---|---|---|---|---|
| Driver 1 | 1 | 5 | 5 | 0 | 40 | 0 | 25 |
| Driver 2 | 5 | 1 | 1 | 0 | 60 | 0 | 75 |

| Quality item | Weighing factor | Category 1 Min threshold | Category 2 Min threshold |
|---|---|---|---|
| 280 — Unit dispatch speed (Range: 0-1200 miles/day) 282 | 0.8  284 | 550  286 | 800  286 |
| 281 — Driver Safety Score (Range: 0-100) 283 | 0.2  285 | 40  287 | 60  287 |
| Desired price for category | | $1.80 /mile  289 | $2.10 / mile  289 |

Quality-Grade weighting factor  0.5  290

Price-Grade weighting factor  0.5  291

292 — Category 1   293 — Category 2

FIG. 15

| Offers | Dispatch Speed | Driver Safety Score | Offer ($ per mile) |
|---|---|---|---|
| Offer-1 | 600 | 80 | $2.00 |
| Offer-2 | 1000 | 80 | $2.30 |
| Offer-3 | 800 | 59 | $1.80 |
| Offer-4 | 560 | 55 | $1.80 |
| Offer-5 | 800 | 80 | $2.00 |

300 — Offers column   301 — Dispatch Speed   302 — Driver Safety Score   303 — Offer

| 292 — Category-1 | Dispatch Speed Quality-Item Grade | Driver Rating Quality-Item Grade | Quality-Grade | Price-Grade | Value-Grade |
|---|---|---|---|---|---|
| Offer-3 | (800 − 550)/1200 = 0.21 | (59−40) / 100 = 0.19 | (0.21 * 0.8) + (0.19 * 0.2) = 0.21 | (1.80 − 1.80) / 1.80 = 0 | 0.5* 0.21 + 0.5* 0 = 0.11 |
| Offer-4 | (560 − 550) /1200 = 0.01 | (55−40) / 100 = 0.15 | (0.01 * 0.8) + (0.15 * 0.2) = 0.04 | (1.80 − 1.80) / 1.80 = 0 | 0.5 * 0.04 + 0.5 * 0 = 0.02 |
| Offer-1 | (600 − 550) /1200 = 0.04 | (80−40) / 100 = 0.4 | (0.04 * 0.8) + (0.4 * 0.2) = 0.11 | (1.80 − 2.00) / 1.80 = − 0.11 | 0.5*0.11 − 0.5*0.11 = 0 |

| 293 — Category-2 | Dispatch Speed Quality-Item Grade | Driver Rating Quality-Item Grade | Quality-Grade | Price-Grade | Value-Grade |
|---|---|---|---|---|---|
| Offer-2 | (1000 − 800) /1200 = 0.17 | (80 − 60) / 100 = 0.20 | (0.17 * 0.8) + (0.20 * 0.2) = 0.18 | (2.10 − 2.30) / 2.10 = − 0.1 | 0.5*0.18 − 0.5*0.1 = 0.09 |
| Offer-5 | (800 − 800) /1200 = 0 | (80 − 60) / 100 = 0.20 | (0 * 0.8) + (0.20 * 0.2) = 0.04 | (2.10 − 2.00) / 2.10 = 0.05 | 0.5*0.04 +0.5*0.05 = 0.05 |

Advanced Settings for Offer Suggestion program

| | North | East | West | South |
|---|---|---|---|---|
| Max travel distance (miles) | 800 | 1000 | 500 | 600 |
| Min price ($/mile) | $2.00 | $1.80 | $2.20 | $2.10 |
| Desired price ($/mile) | $2.30 | $2.10 | $2.30 | $2.20 |
| Price adjustment($/mile) per distance | +$0.15  400 mi | -$0.15  500 mi | +$0.12  300 mi | +$0.10  600 mi |
| Price deduction($/mile) per rejection | $0.10 | $0.20 | $0.05 | $0.05 |

☑ Include deadhead miles in calculations

Choose a center
● Seattle, WA
○ Current location of unit

Price adjustment for load destination transport-unit to load ratio

Price adjustment($/mile) $0.15 per transport-unit to load ratio 1.2

FIG. 18

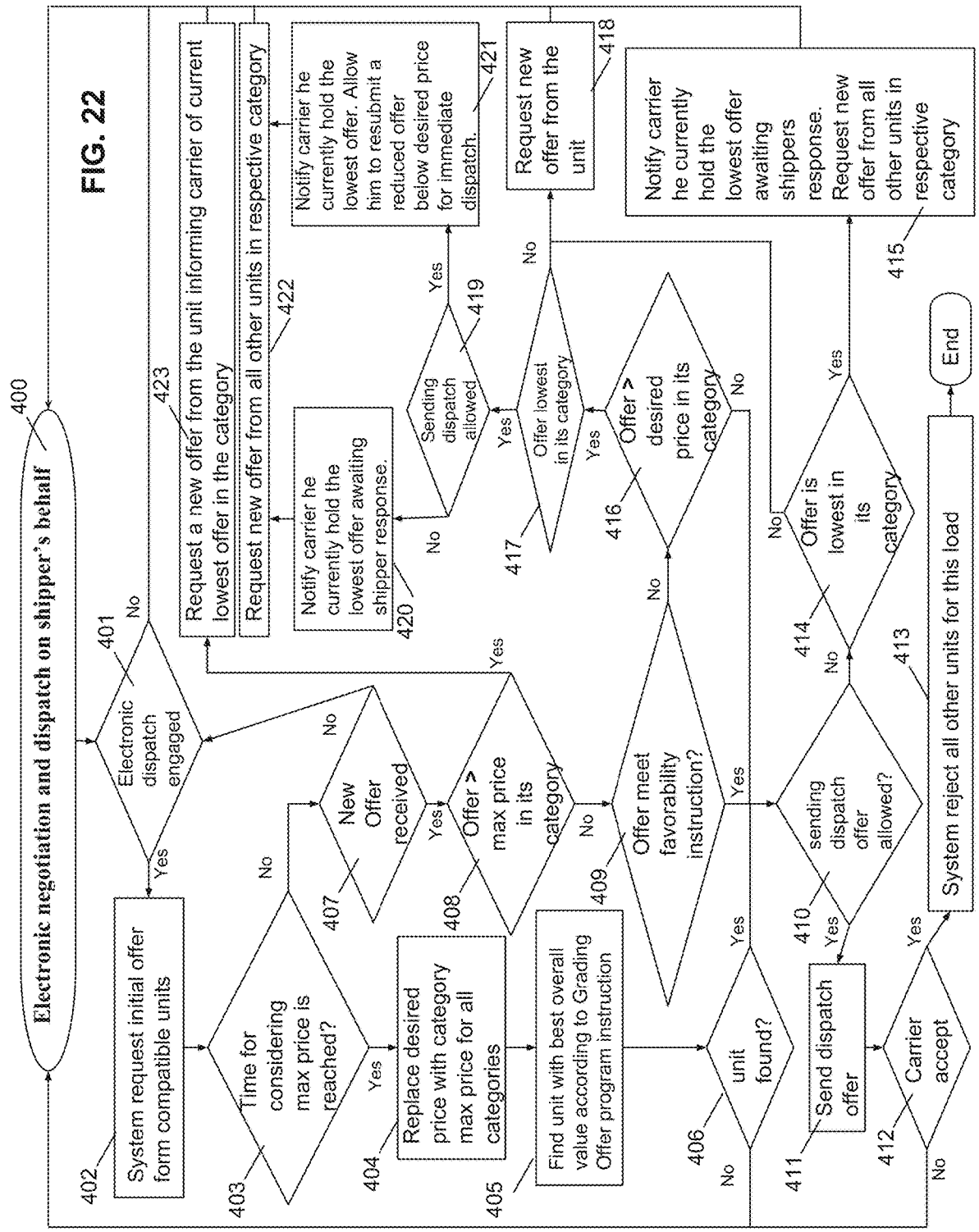

Carrier Electronic negotiation and dispatch Settings

Start time — 500
End time — 501
05/05/2016 ; 12:00 AM
05/05/2016 ; 6:00 AM

☑ Engage offer management — 502

☑ Accept dispatch offer on my behalf — 503

☑ If desired price is not reached after [3.00 hrs] — 505 consider min price — 504

[Add restriction] — 506

Dispatch Restrictions : Dispatch only if all of following requirements are satisfied

Total price exceed [$3500] — 507 if total dollar per mile(deadhead miles included) exceed [$2.00] — 508

Load does not require oversize permit — 509

Load weight is less than [30000 lbs.] — 510

Destination's transport-unit to load ratio is below [1.3] — 511 in last [7 day] — 512

Max deadhead miles [500] — 513

FIG. 23

COMPUTER SYSTEM METHOD OF OPTIMIZING MATCHING AND DISPATCH OF CARGO AND TRANSPORT-UNIT BASED ON INDIVIDUAL TRANSPORT-UNIT AND ITS ELEMENTS QUALITY

CROSS-REFERENCE TO RELATED APPLICATIONS

This Nonprovisional patent application claims the benefit of U.S. Provisional Pat. No. 62/167,063 filed on May 27, 2015.

BACKGROUND OF THE INVENTION

In related art feedback rating received for each of carrier's transport-units are collectively accumulated and attributed to overall rating of the broker or carrier representing that unit and not to the transport-unit or the transport-unit's elements (i.e. driver) responsible for earning such score. This contributes toward many of the problems shippers, carriers and drivers are facing today. For instance under said system drivers have no incentive to offer better customer service or take initiative. In related art when a driver leaves a carrier, his previous employer unjustly continue to benefit or suffer from driver's past performance as driver's rating is not transferred with him at the moment the driver leaves. Same is true in case of a carrier with single transport-unit since any number of elements comprising that unit could change over time but the accumulated feedback rating received for an exchanged element will still be in effect. In related art drivers are unable to establish an accredit proven record for their good performance collected during their career which would otherwise made them more valuable to prospective shippers and hence employers as their level of experience and performance rating grew. Additionally brokers undeservedly receive all feedback rating for carriers' top quality service given they are shipper's primary point of contact. Unlike carriers, brokers' ability to move cargo is not limited by the number of transport-units they own. Hence their collective rating could grow much faster and thus by establishing a good reputation they steer more and more direct business away from carriers which contribute to increased cost for shippers and less profit for carriers.

Related art does not provide users with a systematic way of sending conditional offers and for those offers to be automatically withdrawn if such conditions are violated. This leaves users with no choice but to constantly monitor the status of such transport-unit or load to detect such violations if at all possible.

In related art transport-unit and its element have been used for purpose of asset management and tracking. However individualizing transport-units and its elements without providing meaningful quality metric is not useful for the purpose of evaluation and negotiation. Under current system carriers are unable to systematically offer a competitive price based upon the quality, performance history and rating of individual units and its elements. Hence shippers are presented with a blanket offer from carriers based on carrier's' overall rating and not the quality rating of individual transport-units. Thus in absence of unit's quality metric, even with full visibility and access to carriers' individual units, it is still impossible for shippers to pick the best value offer which is not necessarily always the lowest price. Currently even carrier's overall rating is not a reliable metric since a carrier with good rating could dispatch a unit with poor performance. The shortcomings of the collective rating system could explain why users are not keen to adopt any of the current automated dispatch products. In absence of metrics regarding unit's quality such products have to sacrifice price for quality or vice versa which is not always acceptable by users. Currently shippers are unable to identify and exclusively work with the high performing units in carrier's fleet. Hence if they are dissatisfied with overall performance of a carrier they have no choice but to exclude carrier's entire fleet which is not advantageous for either party. Furthermore shippers are unable to systematically trace or block a transport-unit or an element in a fleet regardless of its association with a carrier or a unit.

Currently since offers are not sent from individual units account, double brokerage is a rampant problem in related art, as carriers and brokers are allowed to acquire more loads than they can handle only to sell excess loads for cheaper rate to other carrier for a profit. The problem is compounded when the carrier or broker with acquired brokered loads use the same system to advertize and broker such loads again.

Although related art has provided shippers with many freight tracking tools but shippers still sustain financial harm due to untimely arrival of transport-units. Current tools provide raw data to be analyzed by shippers to determine whether a particular load is still on track. For instance current tools are used to monitor and notify shippers if a load has crossed or entered a set of predefined areas along a route as opposed to providing an automated delay forecast mechanism to provide shippers with in advance warning for any potential unrecoverable delays.

BRIEF SUMMARY OF THE INVENTION

Some embodiment of present invention compromise of individualizing rating of carrier's transport-units and their composing elements. Present invention enables shippers to view, grade, interact and negotiate based on individual unit quality and feedback rating. Shippers are able to rate each unit or its individual associated elements which are transferable if a transport-unit or element is associated with a new carrier or unit. This allows shippers to track or reject any element or transport-unit regardless of their association. Carriers could also use such rating to recognize and promote the units and elements with superior performance and feedback rating and charge a higher premium accordingly. Often finding the lowest price is not shippers only concern. In such occasion system is equipped to assist shippers to find the best overall value by categorizing and grading transport-units offers according to shippers' specific needs. In present invention lower quality transport-units are able to compete with higher quality units based on the ratio of their quality to price in each category. Every aspect of this process is designed to be deterministic and not to sacrifice price over quality or vise versa. Hence shippers could rely on system to perform various tasks from matching, negotiation and grading offers to finding and dispatching the best overall value offer on their behalf. Similarly carriers no longer required to continuously re-send offers to arrive at an agreement for a final price. When instructed system negotiates and finds an acceptable price within carrier's price range for each transport-unit and if instructed to accept dispatch offers on carrier's behalf. System allows shippers and carriers to define any number of conditions for an offer before such offer is transmitted. If defined, system enforces such conditions by automatically withdrawing said offer if any of the offer's conditions are violated. System's "Delay Forecast Analyzer" enables shippers to detect and pre plan for any anomaly or unrecoverable delay before they turn into an urgent problem.

BRIEF DESCRIPTION OF THE SEVERAL VIEWS OF THE DRAWING

FIG. 4 is an exemplary table in quality database listing carrier quality factors.

FIG. 5 is an exemplary table in quality database listing transport-unit quality factors.

FIG. 6 is an exemplary table in quality database listing equipment quality factors.

FIG. 7 is an exemplary table in quality database listing driver quality factors.

FIG. 14 is an exemplary shipper instruction for Offer Grading.

FIG. 15 is an exemplary carrier offers for a load.

FIG. 16 is an exemplary result of categorizing and grading offers.

FIG. 17 is an exemplary result of categorizing and grading offers.

FIG. 18 is an exemplary screen portion for receiving carrier advanced instructions for Offer Suggestion for a transport-unit.

FIG. 22 is a simplified flowchart of an exemplary method of electronic negotiation and dispatch conducted on shipper's behalf.

FIG. 23 is an exemplary screen portion for receiving carrier instructions for electronic negotiation and dispatch.

DETAILED DESCRIPTION OF THE INVENTION

Figure 1:
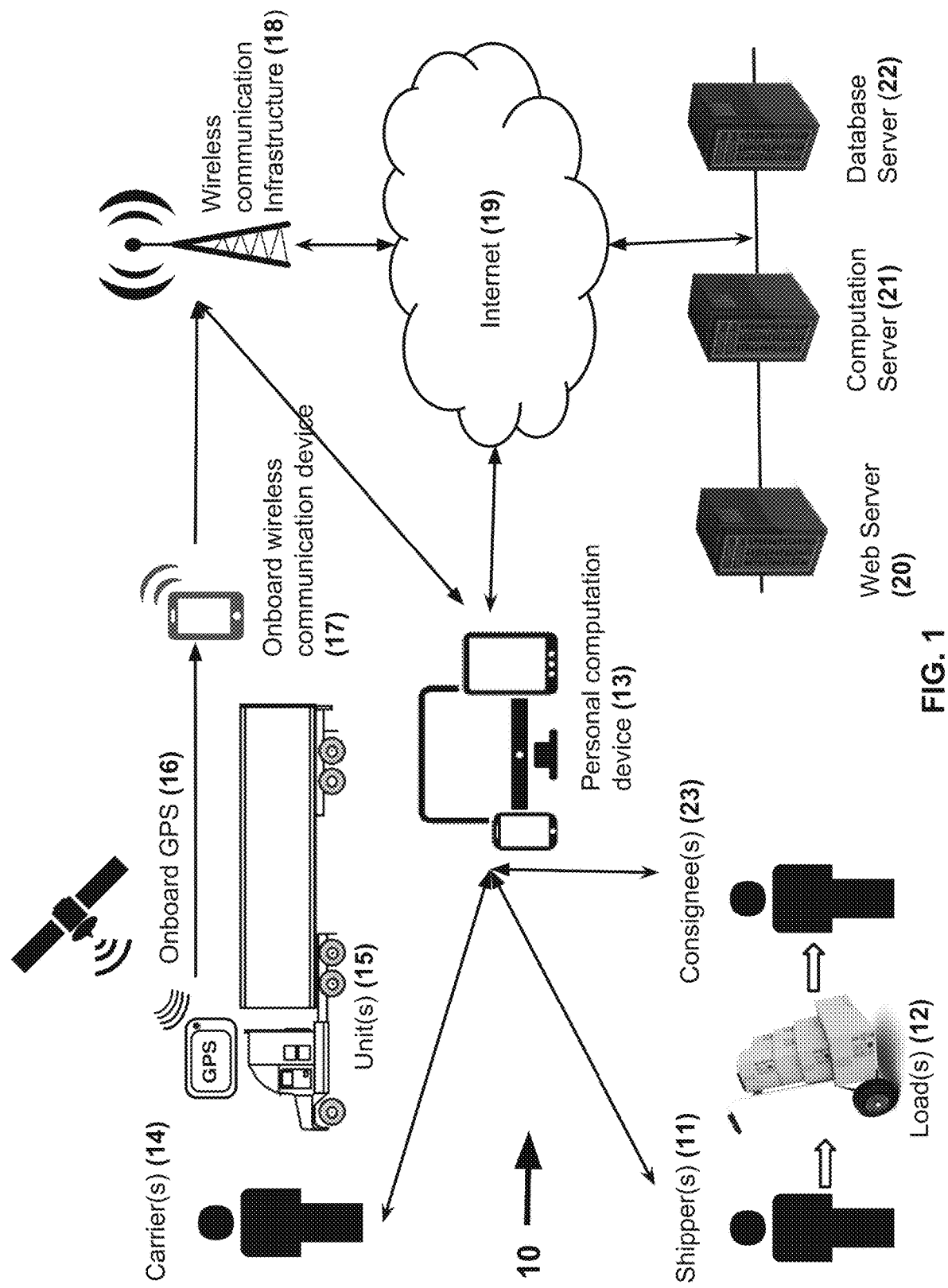
FIG. 1 is a simplified block diagram of an exemplary embodiment of system of electronic matching, negotiation, dispatch and rating for cargo and transport-unit.

FIG. 1 is a simplified block diagram of embodiment of system 10. The term load 12 is used herein to refer to any item that need to be transported (i.e. people, vehicles, food, products, livestock, materials and goods). The terms transport-unit or unit 15 are used interchangeably herein to refer to any self-propelled vehicle capable of transporting loads 12 which drive autonomously or by a driver. The term carrier 14 is used herein to refer to any person or organization who own or is in charge of one or more transport-unit(s) 15. The term shipper 11 is used herein to refer to any individual or organization that hires a transport-unit 15 to deliver a load 12. The term consignee 23 is used herein to refer to a person or organization that is designated and authorized by shipper 11 to receive the load 12. The terms carrier-offer, unit-offer or offer are used interchangeably herein to refer to offer submitted to shipper 11 by carrier 14 for an individual unit 15. The term dispatch offer is used herein to refer to an offer submitted by shipper to carrier. Offer or dispatch offer may or may not contain a price. The term deadhead miles is used herein to refer to unpaid driven miles which carrier has to travel to pick up a load. The term transport-unit account and transport-unit profile is used interchangeably herein to refer to all database record(s) that store relevant unit information for each individual unit. Similarly load account and load profile refers to all database record(s) used to store relevant information for each load individually.

System 10 utilizes one or more web server(s) 20 which is connected to the Internet 19 to allow users 11, 14, 23 to access resources contained within. System 10 also employs one or more memory such as database server(s) 22 to record and maintain all records acquired or produced throughout the process such as profile data, load 12 data, transport-unit 15 data, and history of all the transactions. Auxiliary computational server(s) 21 are used to assist with computations conducted in background such as compatibility check, push notifications, Offer Suggestion, Offer Grading, tracking and tracing units or units elements to name a few.

Shippers 11, consignees 23, and carriers 14 are able to connect and communicate to system 10 by means of any personal computational device 13 which is equipped with an input terminal (i.e. keyboard, mouse, touch screen, voice activated data entry, etc.), a display and a two-way wired or wireless communication device (WIFI, Modem, CDMA, GSM, etc.). Examples of such device with today's technology are any personal computers, laptops, tablets and smart-phones to name a few. Communication between web server 20 and the personal computational device 13 could be established via a wired or wireless network infrastructure 18, 19 using any software package installed on the device 13 such as internet browsers (Chrome, Internet explorer, etc.) or dedicated application software installed on smart-phones, tablets or personal computers.

System 10 requires any registered transport-unit 15 to be equipped with a uniquely identifiable device capable of determining transport-unit's exact position in real-time 16. Examples of such devices are any commercially available plug and play GPS devices for laptops, GPS-capable smart phones, tablets or any Electronic On-board Recorder (EOBR). Such device should be coupled with an onboard wireless communication device (i.e. Satellite linked device, GSM, CDMA) 17 which is capable of transmitting and receiving data (including position data) to the system 10 web server 20 through available wireless communication infrastructure 18, 19. Methods described in system 10 could also be introduced to any commercially available GPS navigation device equipped or coupled with a wireless communication unit.

As will be appreciated by one skilled in the art, aspects of the present invention may be embodied as a system, method or computer program product and for sake of brevity and to avoid repeating what is already understood by a person skilled in the art, details regarding selection, configuration, connection, operation and communication protocol for any component 13, 16, 17, 18, 19, 20, 21, 22 of the system 10 are kept at minimal in claims and description of the invention. Such details are not at the heart of the present invention and only tools to store and access data and to guarantee a reliable, efficient and secure line of communication and data transfer. Such common tools are constantly subject to improvement and change and determined based on the latest available technology and best practices employed now or developed in future.

In following text and diagrams same numerals signify similar entities (methods or items). Pictures, flow diagrams, mathematical formulas and screenshots provided herein are provided as examples to clarify the system 10 and methods described by the invention and by no means are intended to limit or narrow the scope of the invention to one variation. Accordingly, any component of the present invention may be implemented as entirely hardware solution (FPGA, integrated chips etc.), entirely software approach (firmware, software etc.) or a combination of both approach.

User Data Intake process provides tools and services to allow users 11, 14, 23 to interact with system 10 and create and manage user account, capture user preference and feedback, capture load and equipment parameters etc. To activate their account, shippers 11 are required to establish their identity and credibility via variety of methods such as providing a credit card or calling a customer service representative. Similarly only legally authorized carriers 14 are allowed to activate their account. Utilizing established services and tools provided by Federal Motor Carrier Safety Administration and insurance companies, such requirement will be periodically monitored and any violation will result in suspension of the carrier's 14 account or any of carrier's individual transport-unit 15 in violation.

In order to enable shippers 11 to identify, grade, interact, rate and conduct business with individual units 15 and their elements (rather than carrier 14 as a whole) carriers 14 are required to create individual profiles for elements that comprise each transport-unit 15. For instance an on-road-trucking-carrier should create a profile for all tractors, trailers, onboard-GPS capable devices, drivers and managing staffs under his control. To create an account for each element, carrier 14 should provide all necessary and applicable information for said element. For instance to successfully register a tractor carrier should provide information such as make, model, class, dimensions, VIN, authority/legal documents, insurance information etc. Similarly make, model, trailer type, capacity, dimensions, VIN, etc are required for registering a trailer while applicable information for a driver consists of all required legal information (i.e. CDL), health certificate and any endorsements or certificates along with their expirations dates, etc. The unique identification code of each onboard GPS-capable device 16 is captured upon registration to be able to identify which transport-unit 15 is assigned with said device 16. Once an account is created, verified and activated for a unit-element, carriers are no longer permitted to delete said account or alter items related to third parties feedback and performance rating or information that is used to track such element (i.e. equipment VIN #, Driver CDL #, etc.). However carriers are allowed to archive said account if it is no longer in service. Hence once an element is associated to a new unit or a new carrier, carriers are no longer required to create a new account but can simply transfer such element and its rating. After creating an account for a unit, carriers 14 are required to associate one or more unit-element(s) to the unit account to be able to activate said account. For instance an on-road-trucking-carrier should designate a tractor, a trailer (if applicable), an onboard GPS-cable device 16 and a driver (if applicable) for said unit 15. By providing unit's current capacity and setting the availability status of unit to "online" carrier instruct the system 10 to constantly capture and broadcast unit's real time position to shippers in addition to information regarding to quality and feedback rating of the unit and its elements.

Upon activating their account shippers are permitted to post plurality of loads by creating an individual account for each load under their profile. In order to "post" a load 12, shippers 11 should provide all necessary and required parameters for each load 12 such as commodity type, origin, destination, pickup and delivery time, weight, volume/dimensions to name a few. Once a load 12 is posted it remains "available" until such time that load 12 is dispatched or cancelled. Shippers could define any number of preferences for each load and manage each load individually during load's life cycle (i.e. assignment, dispatch, delivery, etc.)

Figure 2:
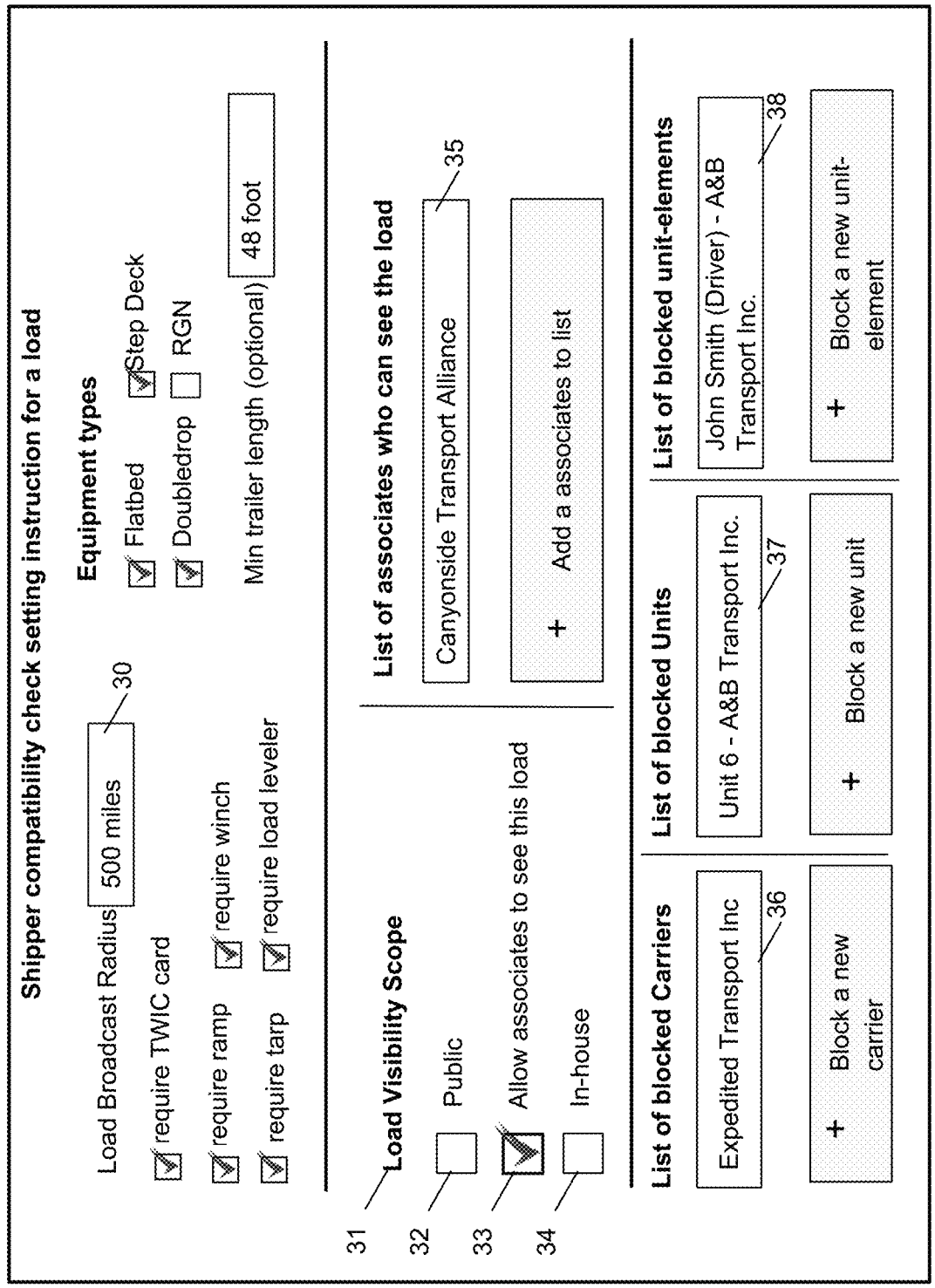
FIG. 2 is an exemplary screen portion for settings shipper preferences for compatibility check.
Figure 3:
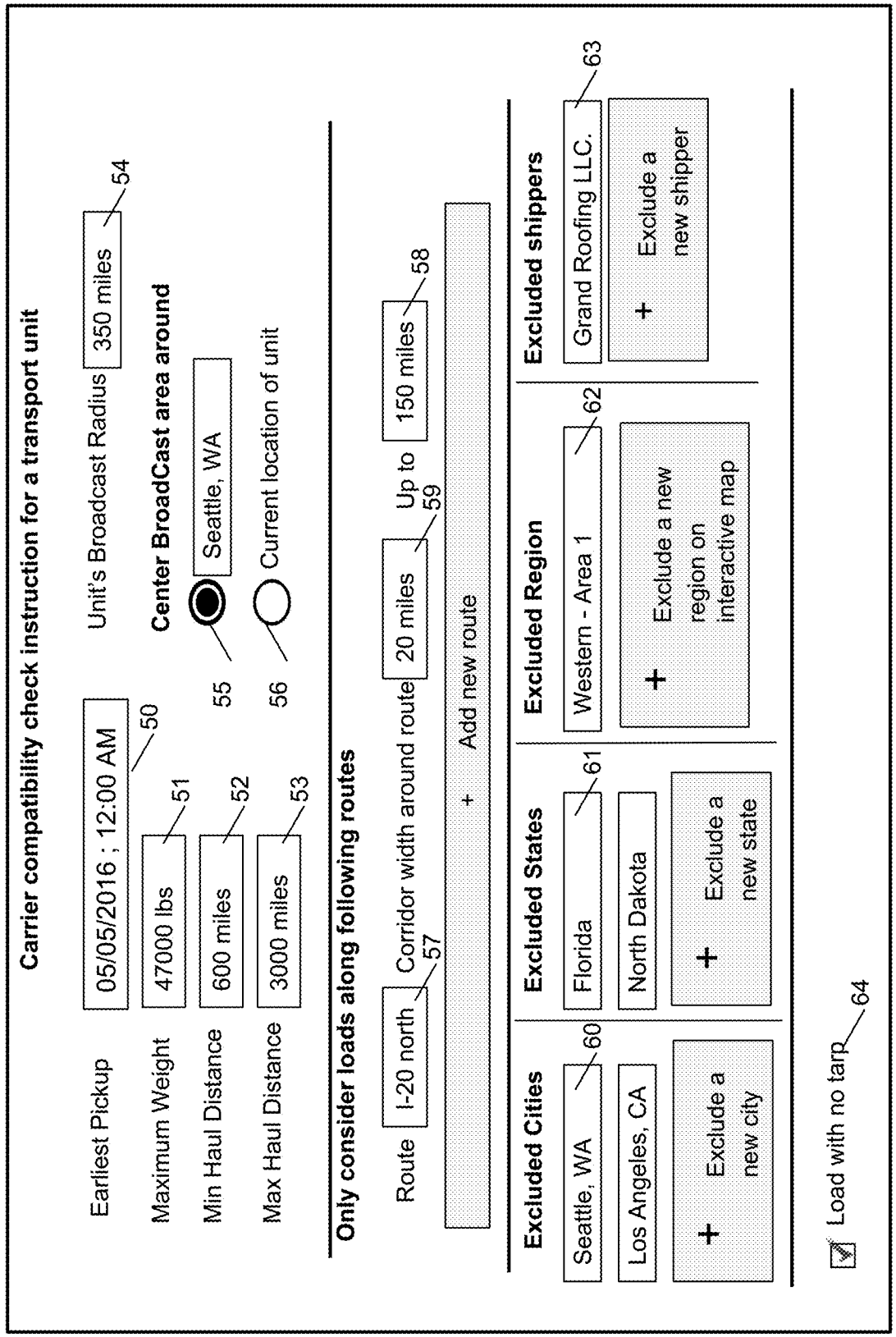
FIG. 3 is an exemplary screen portion for settings carrier preferences for compatibility check.

Users could optionally provide multitude of conditions and preferences to be considered in compatibility check process. As illustrated in FIG. 2, examples of basic shipper's preferences are but not limited to: broadcast radius 30, preferred trailer type, min trailer length, whether the unit should be equipped with basic gears such as ramp, winch, load leveler, gate lift, wheel strap and tarp to name a few. Shippers could set the visibility scope 31 of an individual load 12 to "Public" 32 or "Associates" 33. When visibility scope is set to "Public" 32 every compatible transport-unit 15 is eligible to compete for this load 12 whereas when visibility scope is set to "Associates" 33 only a designated group of carriers' transport-units 35 which are selected by shipper have visibility and access to compete for said load. Shippers have an additional option to exclude any number of carriers transport-units 37 or exclude units comprise of certain undesirable elements 38 such as low quality drivers or equipment from seeing and accessing the load. If shipper excludes a carrier 36 all transport-units under such carrier would be excluded. Carriers are permitted to create one or more in-house shipper account linked to their carrier profile with same tools and services. This arrangement allows the system 10 to distinguish loads posted by shippers versus those posted by carrier from their in-house shipper account. The benefit of such approach is that system 10 enables carriers to limit the visibility scope of their individual loads to "In-House" 34 in addition to "Public" 32 and "Associates" 33. When set to "In-House" 34 only transport-units 15 under the carrier profile have visibility and access to compete for said loads. For instance carriers who lease owner operators and their equipment under their authority could allow owner operators to compete for in-house loads rather than assigning loads with a fixed price to the next available transport-unit in the queue. As illustrated in FIG. 3, examples of basic carrier's unit preference are broadcast radius 54 and chosen center 55, 56, min 52 and max 53 haul distance, maximum weight 51, earliest acceptable pick up date 50 for a load, and exclusion of loads with tarp requirement 64, to name a few. Carriers could optionally exclude certain geographical areas such as specific states 61, cities 60 or customizable regions 62 to exclude loads that originate or destined to such regions. Carriers could also optionally block certain shippers 63 from having visibility and access to their transport-units.

Broadcast Radius: If shipper defines a "Broadcast Radius" 30 (FIG. 2) for a posted load, any transport-unit 15 outside said radius will be excluded from seeing and accessing that load. Additionally excluded transport-units will not be visible to the shipper for said load. As illustrated in FIG. 3 similarly carriers could define "Broadcast Radius" 54 for each of their individual transport-units 15 with the same effect. In cases where both load and transport-units have a designated "Broadcast Radius" 30, 54, the load and unit are not visible to each other unless both said radius 30, 54 overlap. Additionally carriers could define the "Broadcast Radius" 54 around transport-unit's current location 56 or a specific stationary location 55. The latter option 55 is exercised by carriers who wish to preplan the load acquisition ahead of arrival to such location. However shippers are always provided with transport-unit's real time location regardless of such setting 55. Shipper could equally benefit from such arrangement to preplan a load pickup which is not available yet but will become available on or before transport-unit's arrival time at the location. Carrier could also instruct the system 10 to only allow loads in a defined corridor 59 along one or more specific route 57 for a specific length of that route 58. In that case only loads inside said corridor 59 will be considered for the transport-unit. Similarly loads outside said corridor have no visibility or access to said unit.

Quality Database consists of separate tables for carrier 14, transport-unit 15 and unit-elements to store relevant quality, feedback and performance ratings for said items. Once a unit-element is registered, any of its measurable attributes which could be used to evaluate the quality of such element is captured in quality database. FIG. 6 illustrates an exemplary database table for equipment quality which stores information such as age of equipment 101, number of reported breakdown history under load 102, feedback rating 103, overall equipment rating 104, etc. for each registered equipment 100. FIG. 7 illustrates an exemplary quality database table for all registered drivers 110 which stores information such as years of experience 111, drivers experience on any particular equipment (i.e. auto-transport) 112, reported late arrivals (i.e. per month) 113, safety score 114, feedback rating 115, number of accidents(i.e. in last two years) 117 and overall driver rating 118, etc. Quality database contains an additional table for all registered transport-units which stores measurable attributes relevant to individual units 90 such as dispatch speed 91, 96, insurance limits 92, 93, customer rating 94 and overall unit rating 95, etc. as illustrated in FIG. 5. Dispatch speed is a measure on how fast a unit could travel in any given time (i.e. miles per day or miles per hour). Dispatch speed could be assigned by carrier 96 as an average speed of unit or computed by system 91 by considering unit's remaining hours of service, average road speed for a given load and number of drivers assigned to the unit etc. which could be further adjusted by history of dispatch speed measured for that unit. Quality database also contains an additional table to store information relevant to carrier quality such as customer service rating 81 and overall carrier rating 82 as illustrated in FIG. 4. System constantly runs a task in background to adjust ratings in quality database. For example system adjusts element's overall quality rating 104 as equipment breakdown metric 102 changes overtime. Similarly system 10 adjusts relevant feedback ratings and associated overall quality for an item in quality database as soon as a user feedback is received. Shippers could rate any individual element of a dispatched transport-unit for a predefined set of feedback criterion. For instance shippers could rate the quality of the driver separate from the quality of the equipments of a dispatched unit and yet be able to have a separate rating for customer service quality of the carrier itself. Shippers could also provide additional open feedback in form of testimonial for each unit-element, transport-unit or carrier. Overall quality rating for an equipment 104 is determined by computing the rating of each individual quality related to said element 101, 102, 103 and then combining such ratings with a deterministic mathematical formula to arrive at the overall quality rating 104. Same method could be applied to determine the overall quality (i.e. 118) of any registered unit-elements. Similarly unit-quality for each registered transport-unit could be determined by implementing same method as described above by combining all of unit's individual quality ratings 91, 92, 93, 94, 96. The unit overall quality rating 95 is then computed by combining the calculated unit quality and the overall quality of its elements 104, 118 with a deterministic formula. As stated earlier all such calculations are dynamic. For instance if driver of a transport-unit is replaced, the transport-unit's quality rating is recalculate based on the rating of the newly added driver. User have access to review the overall rating of an unit-element 104, 118 transport-unit 95 or carrier 82 or any individual fields of each quality table 81, 91-94, 101-103, 111-117. Such data could be used in any of the related component of the system 10 as one such implementation is explained in details in Offer Grading section later on in this document.

Figure 8:
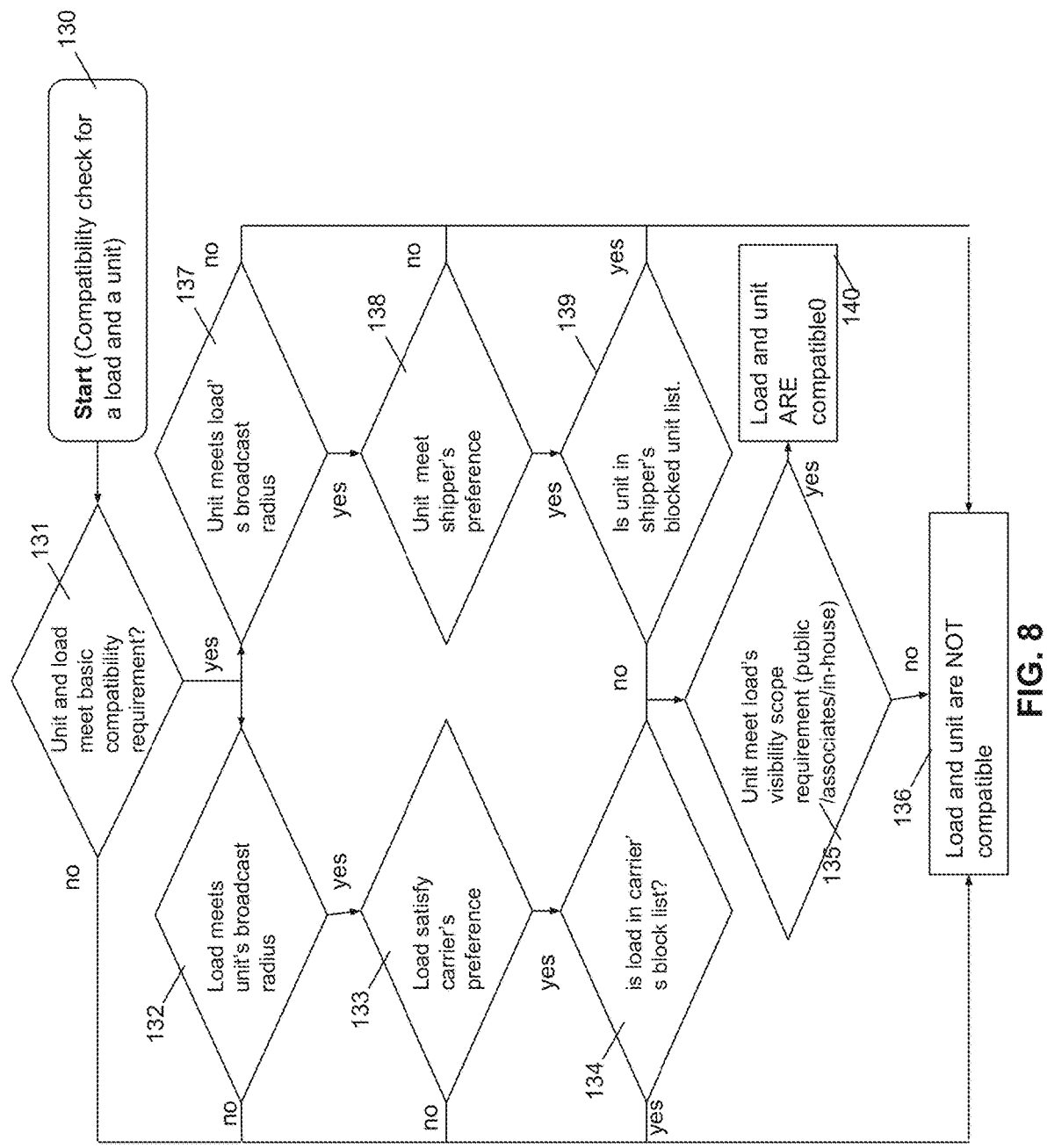
FIG. 8 is a simplified flowchart of an exemplary method of determining if a load and unit are compatible.

Compatibility Check: As soon as there is at least one "available" load 12 and one "available" transport-unit 15, compatibility check algorithm 130 will engage in background for every individual loads and transport-unit as illustrated in FIG. 8. To access basic compatibility 131, system 10 considers basic variable and non-variable factors for load and transport-unit such as: whether a load is hazmat or require refrigeration, load's dimension/volume/weight, load's pickup/delivery time, load's origin/destination and transport-units' remaining capacity, current location, unit's driver endorsements (hazmat, tanker, TWIC card, etc) and equipment type to name a few. If a load and transport-unit pass basic compatibility check 131 they will be further examined to determine if they meet shipper's and carrier's preference 132-134, 137-139 for that particular load and transport-unit. Only when all basic compatibility and user preference check are met the load and transport-unit are considered compatible 140 and become visible to respective parties. This process is constantly repeated in background so if a previously compatible pair of load and transport-unit are no longer compatible (i.e. transport-unit travels outside of load's broadcast radius etc.) the pair will no longer be considered compatible 136. Such discovery is then broadcasted to all relevant component of system 10 for further processing. For instance when a carrier has made an offer for a load, such offer is automatically retracted by system 10 if transport-unit is not yet dispatched and is no longer considered to be compatible to that load.

Figure 9:
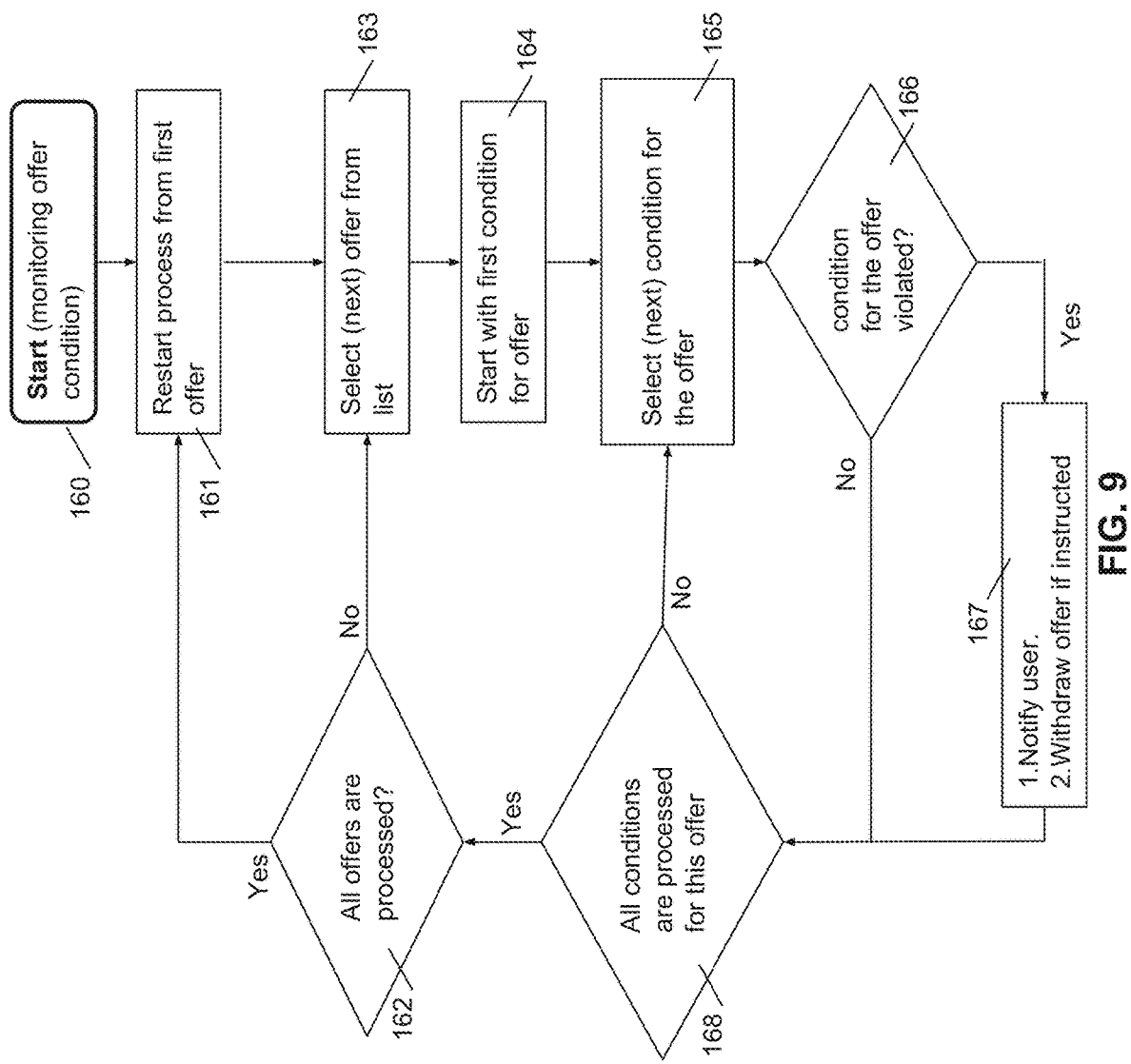
FIG. 9 is a simplified flowchart of an exemplary method of monitoring offer-conditions and to notify or withdraw the offer if an offer-condition is violated.

Conditional Offer: System 10 allows parties to extend or accept an offer contingent upon one or more predefined condition(s). As illustrated in FIG. 9 such conditions are then constantly monitored 164. 165, 168 by system 10 for each offer 161, 163 and upon violation of any of the conditions 166 system 10 withdraw 167 such offer automatically on user's behalf. For example carrier could define commitment-expiration-time and commitment-radius around the load location prior to sending a committed offer, so in a case the transport-unit travels outside said radius or did not receive dispatch offer within said time frame the commitment will be withdrawn immediately by system 10. Shipper could similarly define a radius around a load pickup location or an expiration time when sending a dispatch offer to a unit for the offer to be withdrawn if the transport-unit travels outside such radius or does not respond within the designated time frame.

Load Assignment and Acquisition: In this process carriers and shippers will be presented with a list of compatible loads and transport-units respectively upon request. Utilizing tools and services provided by system 10 parties could conduct a meaningful and efficient negotiation and extend or accept offers without a need for further communication outside of system 10 (phone calls or text messaging).

Figure 10:
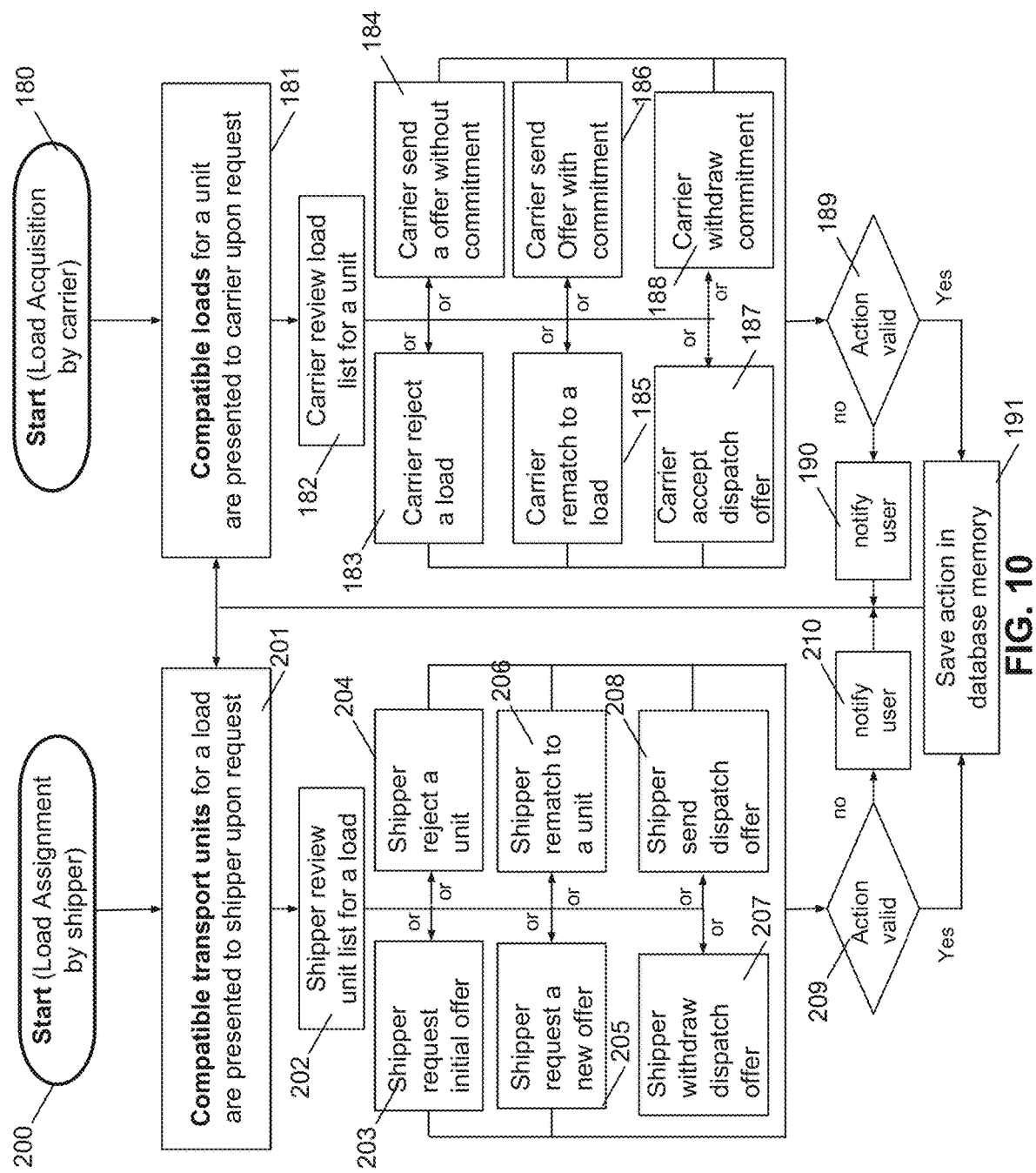
FIG. 10 is a simplified flowchart of an exemplary method of load assignment and load acquisition conducted by users.

Load Acquisition: FIG. 10 contains a simplified block diagram for "Load Acquisition" process 180 when conducted by carrier. As soon as one or more compatible load(s) is found for a given transport-unit 181, carrier could review 182 such list and is able to perform several actions depending on the status of a load. For example for a load that has no offer or if shipper has requested a new offer, carrier could send or respond with a committed 186 or none-committed 184 offer or reject 183 said load. Once an offer is sent the carrier is no longer permitted to change offer's price unless shipper request a new offer from the transport-unit. If carrier has sent a committed offer 186 and shipper has not yet accepted, carrier has an option to withdraw such commitment 188. At any stage before a load's dispatch offer is accepted, carrier could reject the load 183 which prevent shipper from any further interaction with the given unit for said load. Carrier could optionally rematch 185 to a load that he previously rejected 183 but he is not allowed to adjust his previous offer for that load. Said action 185 restore shipper's access to the unit. For non-committed offers 184 carrier could accept 187 or reject 183 a dispatch offer received from shipper. However if carrier has pre-committed 186 to a load and receive a dispatch offer from shipper, system 10 will accept the dispatch offer immediately on carrier's behalf. Before an action is performed 191 system 10 check whether that action is still valid 189 in case the load status has changed since last time user page was refreshed and if action is no longer valid 189 user is notified 190 accordingly. Once a transport-unit is dispatched, system 10 will calculate the transport-unit's remaining capacity and require carrier to verify such calculation. Remaining capacity is calculated by subtracting acquired load's dimension/volume and weight from equipment's current capacity and weight respectively. Remaining capacity is used by system 10 to reject all the loads that exceed transport-unit's current capacity. However if the transport-unit has no remaining capacity, the transport-unit status will be set to "Offline" and the transport-unit becomes invisible to shippers for further load matching and assignment process.

Load Assignment: FIG. 10 contains a simplified block diagram of "Load Assignment" process 200 when conducted by shipper. As soon as one or more compatible transport-unit(s) is found for a given load 201, shipper could review 202 such list and conduct several actions depending on the status of a transport-unit. For example for a transport-unit that has not yet sent an offer, shipper could request an initial offer 203. In case a transport-unit has extended an offer shipper is permitted to request a new offer 205 if the offer is not the lowest offer in its category. If said carrier respond with the same offer price twice, shipper is no longer permitted to request a new offer 205 from that particular transport-unit. Shipper could optionally send a dispatch offer 208 to any transport-unit with a pending offer and is permitted to retract said dispatch offer 207 if carrier has not yet accepted the offer. At any stage before a unit is dispatched shipper is permitted to reject 204 the transport-unit which then prevent the carrier from further interaction with the load for said unit. Shipper could optionally rematch 206 to a unit that he previously rejected 204 which restore carrier unit access to this load. Upon acceptance of a dispatch offer by a transport-unit the load is removed from the list of "available loads" and it will no longer be visible to carriers' transport-units. Shipper can optionally send multiple dispatch offers to several transport-units at the same time for a given load. In that case the first unit that accepts the dispatch offer will be dispatched to deliver the load. Shipper has an additional option to prioritize said dispatch offers by assigning priority level to each offer with an expiration time and optional distance radius. In that case system 10 start by sending a dispatch offer to the transport-unit with highest priority. If carrier fails to respond within defined deadline, travels outside the defined radius, or rejects such offer system 10 send a dispatch offer to the next transport-unit in queue. This process continues until a carrier accepts a dispatch offer or all dispatch offers are rejected.

Favorite List: Shippers could optionally assign a transport-unit or an element of a transport-unit (i.e. driver) a favorability level (i.e. 0-10) and add it to their favorite list. This information is then stored in database to be used in Offer Grading and any other relevant module. Shipper can also allow system 10 to dynamically adjust favorability level of a unit or unit-element based on number of satisfactory delivery result. Favorability level is in addition to feedback rating that shipper could provide for said entities as explained earlier in quality database.

Figure 11:
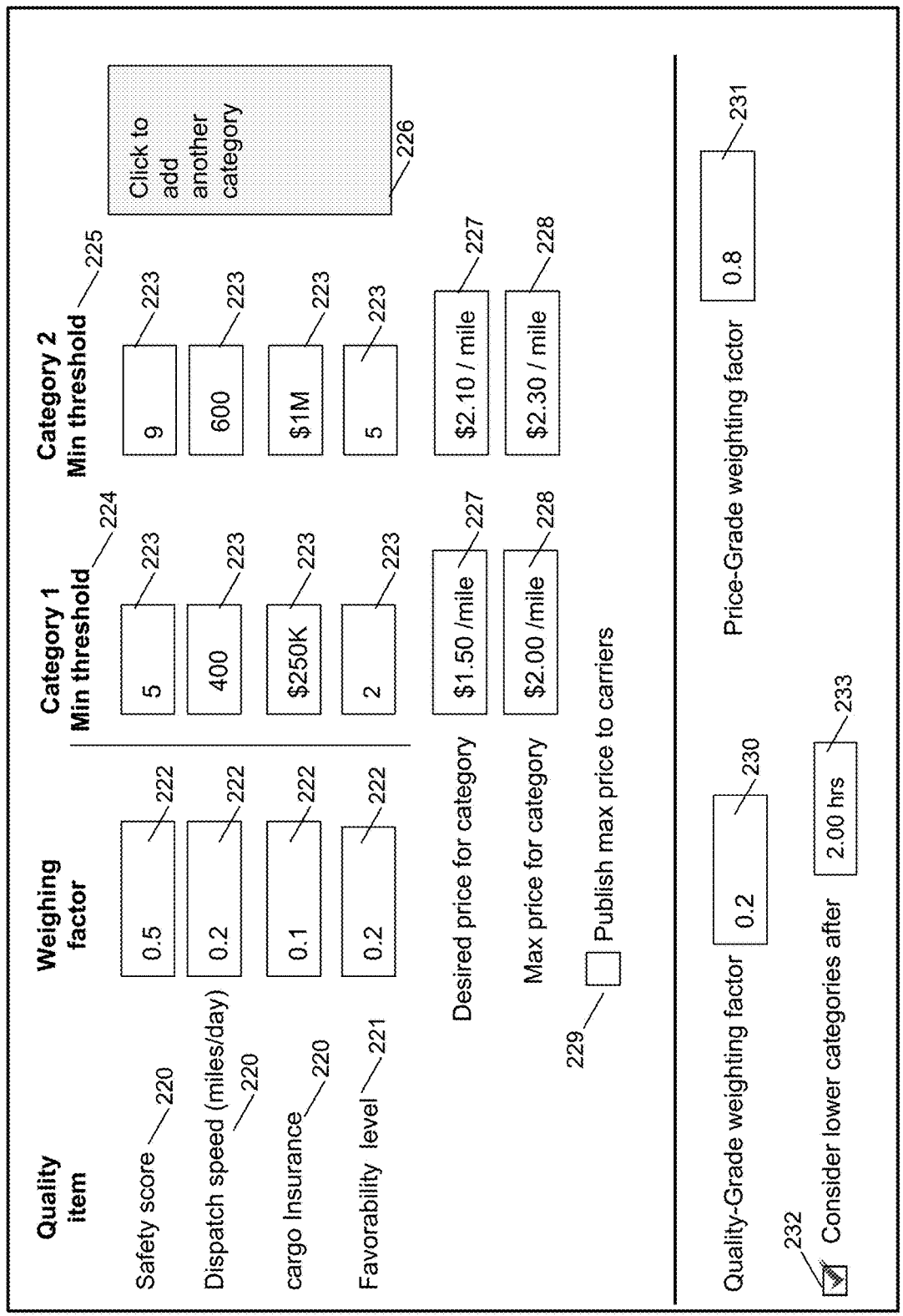
FIG. 11 is an exemplary screen portion for receiving shipper instructions for Offer Grading.

Offer Grading: Often finding the lowest price is not the only consideration for a shipper. System 10 is designed to assist shippers to find the best value offer on such occasion. When instructed system 10 categorize and grade each received offer for a given load based on criterion selected by shipper. As illustrated in FIG. 11 system 10 allow shippers to select one or more Quality Item 220, 221 and assign a weighing factor 222 for said item 220, 221. Quality Items 220, 221 could be any item from quality database tables or any other measurable attribute of the carrier, transport-unit and transport-unit's elements (i.e. favorability level 221). To engage the grading mechanism the shipper must define one or more category 224, 225 and assign a minimum threshold 223 for each "Quality Item" 220, 221 as well as a threshold for desired price 227 and maximum price 228 in that category 224, 225. The thresholds 223, 227, 228 for categories 224, 225 are set to be increasing monotonically, hence when a new category 225 added all its threshold 223, 227, 228 must be equal or greater than the relevant thresholds 223, 227, 228 from the previous category 224. Shipper must then set the weighting factor for Quality-Grade 230 as well as weighting factor for Price-Grade 231 which their function is explained fully later on in this document.

Figure 12:
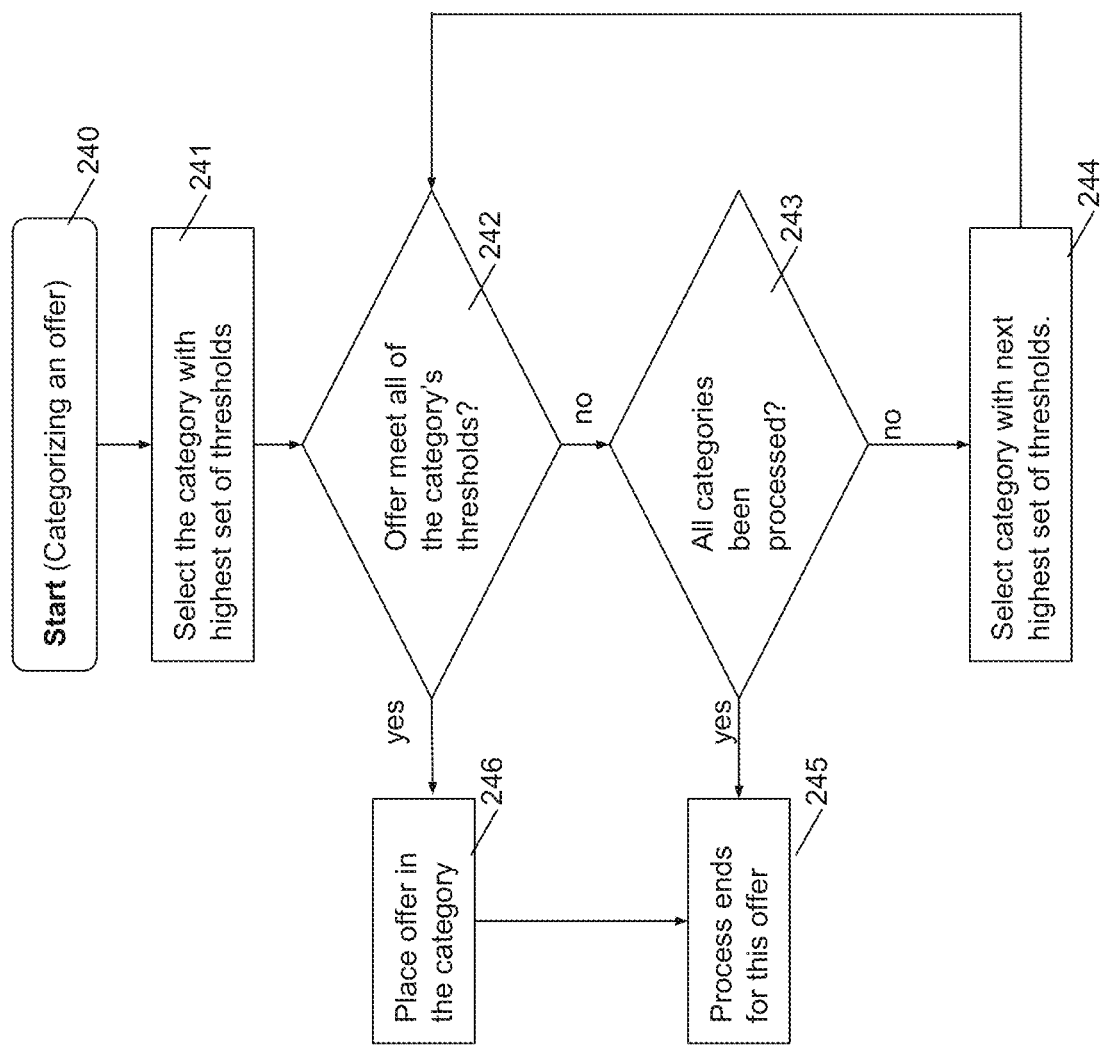
FIG. 12 is a simplified flowchart of an exemplary method of categorizing an offer.

As illustrated in FIG. 12 system 10 categorize the received offers 240 by comparing the relevant Quality-Item reading of each transport-unit against thresholds of category 223 (FIG. 11) with highest thresholds 241, 242. Thresholds for desired price 227 (FIG. 11) and maximum price 228 (FIG. 11) for each category are ignored for purpose of categorizing the offer. If all respective unit Quality-Item readings meet the minimum thresholds set for said category 242, the offer is placed in that category 246, otherwise the process repeated with the next category with highest threshold 244. If a unit does not fall in any of the set categories the unit and loads are not considered for grading. When categorizing an offer, unit favorability level 221 (FIG. 11) behave differently from other Quality-Items 220 (FIG. 11). When a unit does not have an assigned favorability level the system 10 only use rest of Quality-Items (excluding the favorability level quality-item) for categorizing the offer associated with that unit. The favorability level of said unit to 0 for grading purpose.

Figure 13:
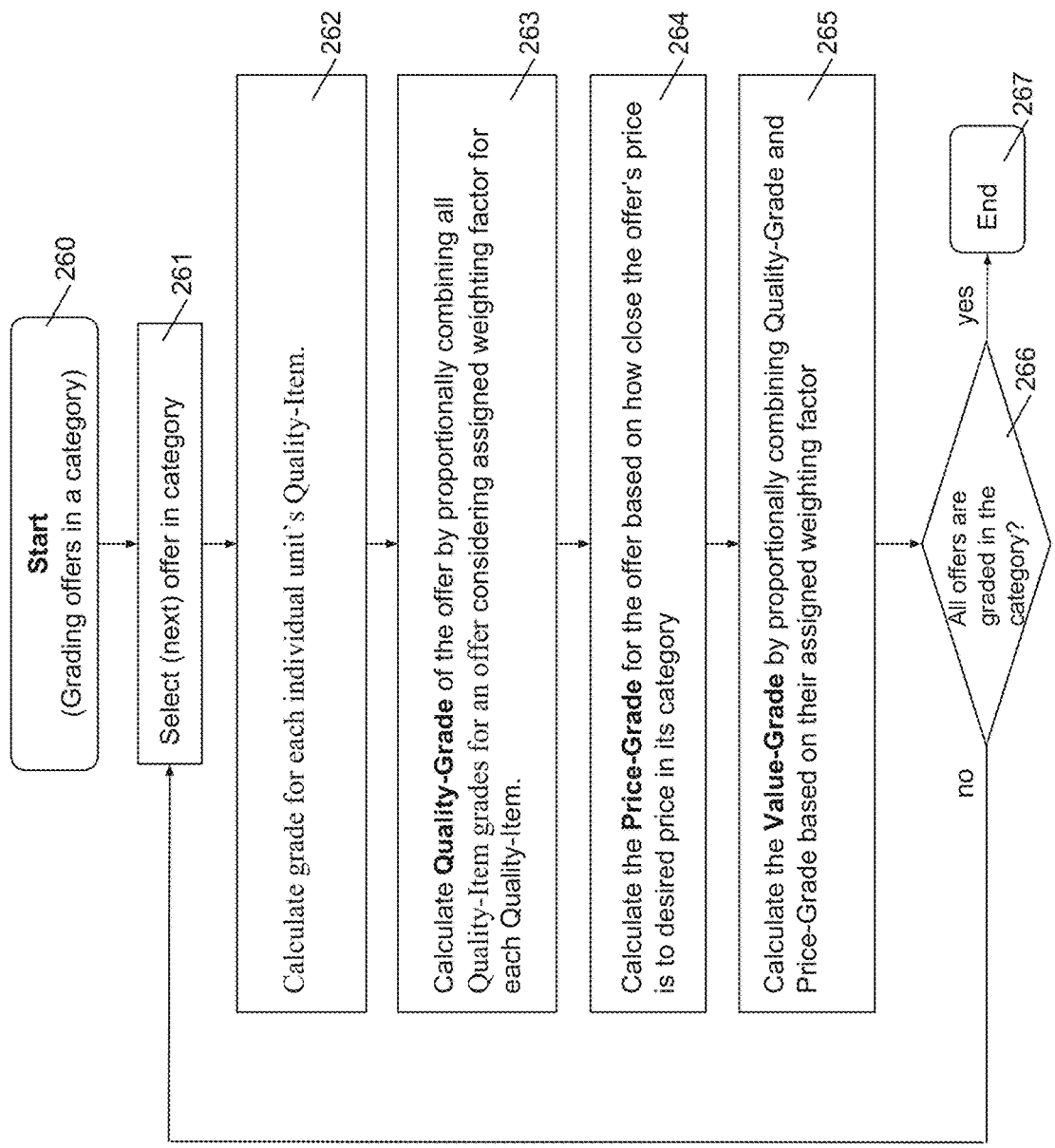
FIG. 13 is a simplified flowchart of an exemplary method of grading an offer.

As illustrated in FIG. 13 quality-item grade is calculated 262 for each individual unit's quality item 220, 221 (FIG. 11) in each category for a given offer 261. Said calculation is based upon how unit's quality items associated with the offer 220, 221 compares to its relevant threshold in that category. Offer's Quality-Grade is then calculated by combining all weighted Quality-Item grades based on their corresponding weighting factor 263. The Price-Grade is calculated 264 by considering how the price of the offer compares to shipper desired price for each category 227 (FIG. 11). Value-Grade is then calculated 265 by combining the weighted Quality-Grade and Price-Grade based on corresponding weighting factor 230, 231. The system 10 then use the "Value-Grade" to sort and prioritize offers in each category. Shippers could sort and prioritize offers solely based on Quality-Grade or Price-Grade by setting the relevant weighting factor to zero accordingly. When the category with the highest threshold contains offers which are equal or below shipper's desired price the best overall value is the offer with highest Value-Grade among said offers. Otherwise if shipper has indicated his desire to consider offers in all categories 232, 233 (FIG. 11) the best overall value is the offer with highest Value-Grade to Price-Grade ratio among all categories. In case there are multiple offer with same Value-Grade and Price-Grade in multiple categories system 10 favor the offer in category with highest threshold. If shipper has not permitted system to consider offers from categories with lower threshold 232, 233 (FIG. 11) and no offer meet desired price in the category with highest threshold system consider the offer with highest Value-Grade as best overall value offer.

To clarify the point further following example is drafted to indicated how an offer could be categorized and graded based on provided parameters. However the simplistic mathematical formulas used in this example are one variation of such approach and are intentionally kept simple for the purpose of illustration. As illustrated in FIG. 14, shipper is assumed to be interested in filtering and grading offers based on unit's dispatch speed 280 and driver safety score 281 while favoring dispatch speed 280 over the driver safety score 281 by assigning a higher weighting factor for dispatch speed 284 in comparison to weighting factor 285 for driver safety score 281. In this variation sum of assigned weighting factors 284, 285 must always be 1. Assuming shipper has received five offers 300 as illustrated in FIG. 15 where each offer 300 contains information regarding unit dispatch speed 301, driver safety score 302 of the driver associated with that unit and the unit offer price 303.

By comparing unit's dispatch speed 301 and unit's driver safety score 302 against threshold set for dispatch speed 286 and driver safety score 287 in each category 292, 293 system 10 will place offer-2 and offer-5 in category-2 293 whereas offer-1, offer-3 and offer-4 are placed in category-1 292 as illustrated in FIG. 16, 17. In this method each quality item is graded 310, 311 by measuring how far it is placed from set relevant threshold by subtracting the unit's rating 301, 302 from respective quality item threshold 286, 287 in its category 292, 293 and dividing it by the associated quality item range 282, 283 in each category 292, 293.

For example the grade for dispatch speed 310 of offer 3 300 is calculated as:

"Offer3 Dispatch Speed Grade 310"=("offer3 dispatch speed 301"−"category1 dispatch speed threshold 286")/"dispatch speed range 282"

Quality-Grade 312 for each offer 300 is then calculated by multiplying the weighting factor 284, 285 of the relevant quality item 280, 281 and the grade calculated for that Quality Item 310, 311 and summing the result.

For example offer3 quality-grade 312 is calculated as follows:

"Offer3 quality-grade 312"="weighting factor for dispatch speed 284"*"category1-Dispatch Speed Grade 310"+"weighting factor for driver quality 285"*"category1-driver quality Grade 311"

Price-Grade 313 of each offer could be calculated by subtracting desired price threshold 289 from unit's offer price 303 and dividing the result by price threshold 289 for each category 292, 293.

For example offer3 price grade 313 is calculated as follows:

"offer3 price-grade 313"=("category1 desired price 289"−"offer3 price 303")/"category1 desired price 289"

The Value-Grade 314 is then calculate by multiplying the weighting factor for Quality-Grade 290 to Quality-Grade 312 then multiplying the weighting factor for Price-Grade 291 to Price-Grade 313 and then summing the result of both operation.

"Offer3 Value-Grade 314"="Quality-Grade weighting factor 290"*"offer3 Quality-Grade 312"+"Price-Grade weighting factor 291"*"offer3 Price-Grade 313"

The offers are then sorted in each category 292, 293 based on their Value-Grade as descending order. In this example the best overall value offer is offer 5 since it is the highest Value-Grade offer below shipper's desired price in the category with highest thresholds.

Offer Suggestion: As illustrated in FIG. 18 carriers could optionally define advanced set of parameters for any transport-unit to be used by system 10 to provide a suggested minimum and desired price for each individual unit. Carrier are allowed to define parameters such as "Max Travel Distance" 324, "Minimum Price per mile" 325, "Desired Price per mile" 326, "Price Adjustment per distance" 327 and its associated distance factor 328 and "Price Deduction per Rejection" 329 for all major direction of North 320, South 323, East 321 and West 322. "Max Travel Distance" 324 in each direction 320-323 specifies transport's unit preferred general region of operation centered around transport-unit's current location 332 or a designated stationary location 331. When defined, "Max Travel Distance" 324 overrides "Broadcast Radius" setting and is used to exclude loads that fall outside the specified general region of operation. Carrier could also define a price adjustment 333 for specific transport-unit to load ratio 334 at load's destination.

Figure 19:
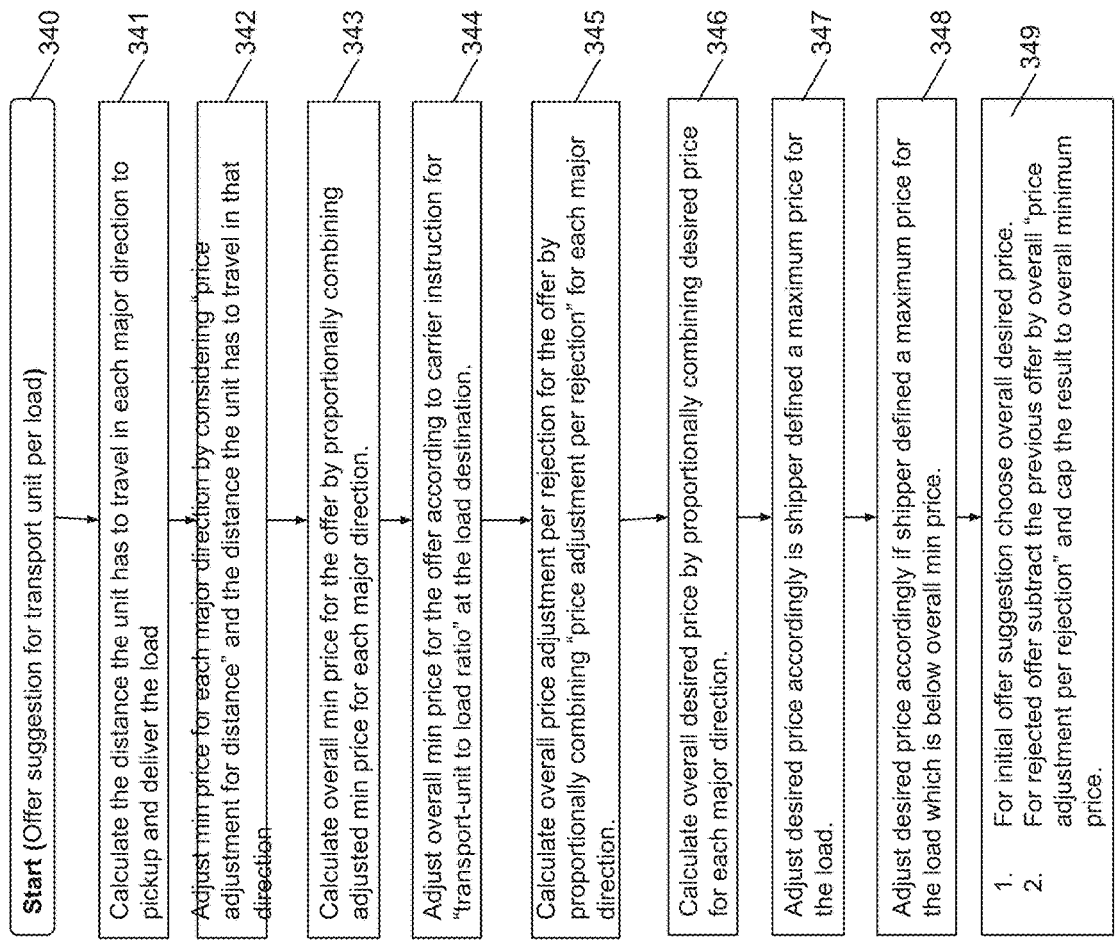
FIG. 19 is a simplified flowchart of an exemplary method of suggesting offer for a load.

As illustrated in FIG. 19 to determine a suggested offer for a unit for a given load 340 system 10 calculate the travel-distance 341 in each major direction 320-323 (FIG. 18). Travel-distance is the distance the transport-unit has to travel in each major direction 320-323 to pick up and deliver the load. This calculation could be based on finding the shortest distance between pickup and delivery location mathematically or using third party tools such as Google navigational database or similar technologies. If carrier indicated that the deadhead miles shall not be included in calculation 330 (FIG. 18) the distance traveled to pickup the load is not considered for such calculation. Using the calculated travel-distance for each major direction, the minimum price 325 (FIG. 18) for each major direction 320-323 (FIG. 18) is adjusted based on "Price Adjustment per Distance" 337 (FIG. 18) according to travel-distance in that direction considering the defined distance factor 328 (FIG. 18) for that direction. Having the adjusted minimum price for each major direction system 10 could then calculate the overall minimum price 343 for the load by combining the adjusted min price in each major direction in proportion to travel distance in that direction. Similarly the same method is used to calculate the overall desired price 346 as well as overall price reduction per rejection 345 for the offer. The overall minimum price is then adjusted proportionally 344 by considering transport-unit to load ratio at load destination and provided thresholds for transport-unit to load ratio 334 (FIG. 18) and related price adjustment rate 333 (FIG. 18). Calculated overall minimum and desired price will be used to assist carriers with an initial suggested price when making an offer for a load and also warn carriers if their offer violates overall minimum price. Such calculations are also used in electronic negotiation and dispatch as described later on in this document.

Figure 20:
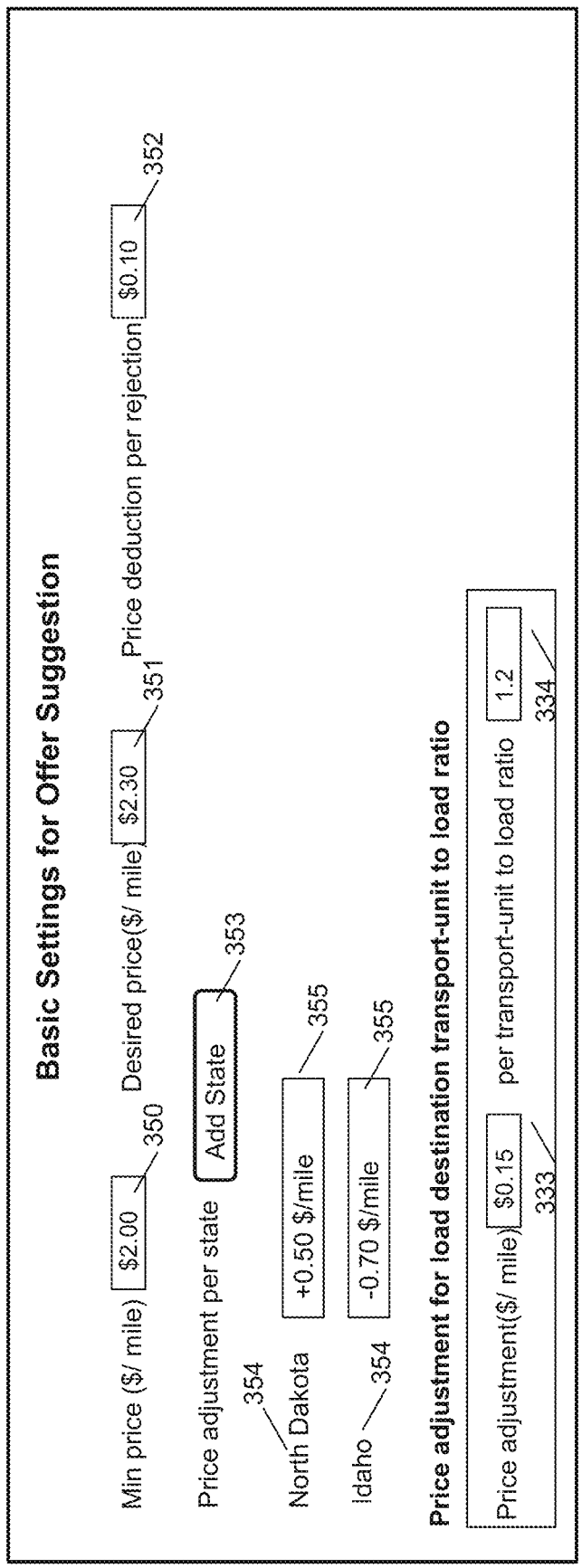
FIG. 20 is an exemplary screen portion for receiving carrier basic instructions for Offer Suggestion for a transport-unit.

Carriers could alternatively opt out to use a more basic approach for Offer Suggestion as illustrated in FIG. 20. In this approach carrier could statically define their overall minimum price 350, overall desired price 351, overall price deduction per rejection 352, price adjustment per state 355 and price adjustment 333 for specific transport-unit to load ratio 334 at load's destination. In this case the overall minimum price will be adjusted if load destination falls in any of the defined states 354 by adding price adjustment per state 355 to the min price 350.

In both cases if shipper has defined a max price for a load which is within range of carrier's min price and desired price the initial offer will start from shipper's max price 348 (FIG. 19) rather than calculated overall desired price for said load.

Figure 21:
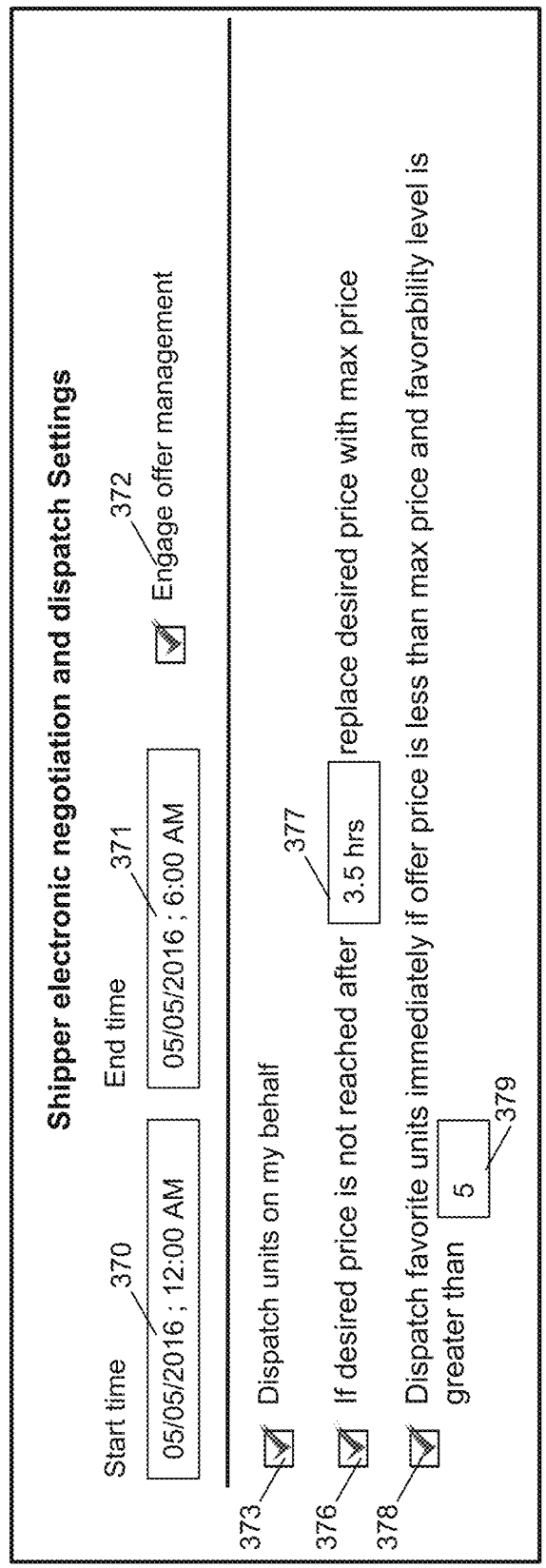
FIG. 21 is an exemplary screen portion for receiving shipper instructions for electronic negotiation and dispatch.

Negotiation and Dispatch Management—Shipper: Shippers could optionally instruct system 10 to negotiate with and dispatch transport-units on their behalf for any individual load. System 10 use information provided in "Offer Grading" as baseline for price negotiation and to select units for dispatch. As illustrated in FIG. 21, shipper could engage electronic offer management 372 and define a activation time frame 370, 371 for said operation. Shipper could additionally instruct the system 10 to send dispatch offer and dispatch units 373 on shipper's behalf. Shipper could additionally instruct the system 10 to consider the max price for dispatching units 376 if the desired price is not met within a predefined amount of time 377 after negotiation process started 370. Additionally shipper could instruct the system to favor the units in his favorite list for immediate dispatch 378 when said unit's offer is below the maximum price. Shipper could further optionally narrow the list of favorable units by defining a minimum favorability level 379 so only units with favorability level above said value 379 will be considered for immediate dispatch.

FIG. 22 is a simplified block diagram for Negotiation and Dispatch Management 400 when conducted on shipper's behalf. When electronic offer management is engaged and the user regional time is within defined activation time frame 401, system 10 will request offers 402 from all transport-units meeting shipper's preferences for a given load during the process 400. If shipper has instructed the system 10 to consider max price for dispatch process, system 10 check whether the corresponding timer has expired 403. If that is the case system 10 replace the desired price with respective max price in each category for all categories 404. It then attempts to find the best value offer 405 according to "Offer Grading" instruction. If such offer is found 406 system send a dispatch offer to the associated unit immediately 411 if allowed to do so 410. Otherwise system 10 resume normal operation by waiting until it receives a new offer from a carrier 407. Once an offer is received 407 system 10 check whether the offer price exceeds the max price in its respective category 408. If that is the case system request a new offer from carrier informing him of the lowest price in the category 423. Otherwise if the offer meets shipper's instruction in regard to considering favorite units for immediate dispatch 409 and shipper has permitted system to send dispatch offers 410, system will immediately send a dispatch offer to said unit 411. If carrier accepts the dispatch offer 412 the process ends for this load and system perform maintenance tasks 413 such as rejecting all other units with pending offer for this load. In case the unit offer is below the max price 408 but unit does not meet shipper's instruction regarding favorite units 409, system check to see if the offer is below shipper's desired price in its category 416. If that is the case and system is allowed 410, system sends a dispatch offer to the unit immediately 411. Otherwise if the offer is above shipper's desired price in its category 416 but the lowest offer in its category 417 system request a new offer from all other units in that category 422 and notify the unit with lowest offer that said unit is holding the lowest offer 420, 421. And if system is allowed to send dispatch offer 419 said unit is permitted to resubmit a reduced offer below shipper's desired price in its category 421 if the carrier wish to be considered for immediate dispatch. In case shipper has not instructed the system 10 to consider the max price for dispatch 403 if desired price is not met all offers above shipper's desired price will be saved to be reviewed by shipper to make a decision personally later on.

Negotiation and Dispatch Management—Carrier: Carriers could optionally instruct the system 10 to negotiate offers and accept dispatch offers on their behalf for any given unit. System 10 use information provided in "Offer Suggestion" as a baseline for price negotiation and accepting dispatch offers. As illustrated in FIG. 22, carrier could engage electronic offer management 502 and define an activation time frame 500, 501 for said operation. Carrier could additionally instruct the system 10 to accept dispatch offer 503 on his behalf. User could further instruct the system 10 to consider the min price 504 if no load was found to satisfy the desired price within predefined amount of time 505 after the offer management has started 500. Carrier could optionally specify additional set of more restrictive criteria for accepting dispatch 506, so only dispatch offer that meet those criteria are accepted. For example carriers could specify their interest in only loads that their total weight is less than a certain value 510 which do not require oversize permit 509 and only travel to destinations that at least have had a specific transport-unit to load ratio for a particular equipment type 511 in a given time frame 512 and finally generate a minimum specified income 507 that its calculated dollar per mile is greater than a certain value 508. Any load that fall short of such restriction will not be dispatched but stored for carrier's review. Transport-unit to load ratio could be provided by a third party or calculated by system periodically in background for each specific region and each type of equipment based on available loads and transport-units present in each region as well as availability projection of in-transit transport-units committed to different destinations.

Figure 24:
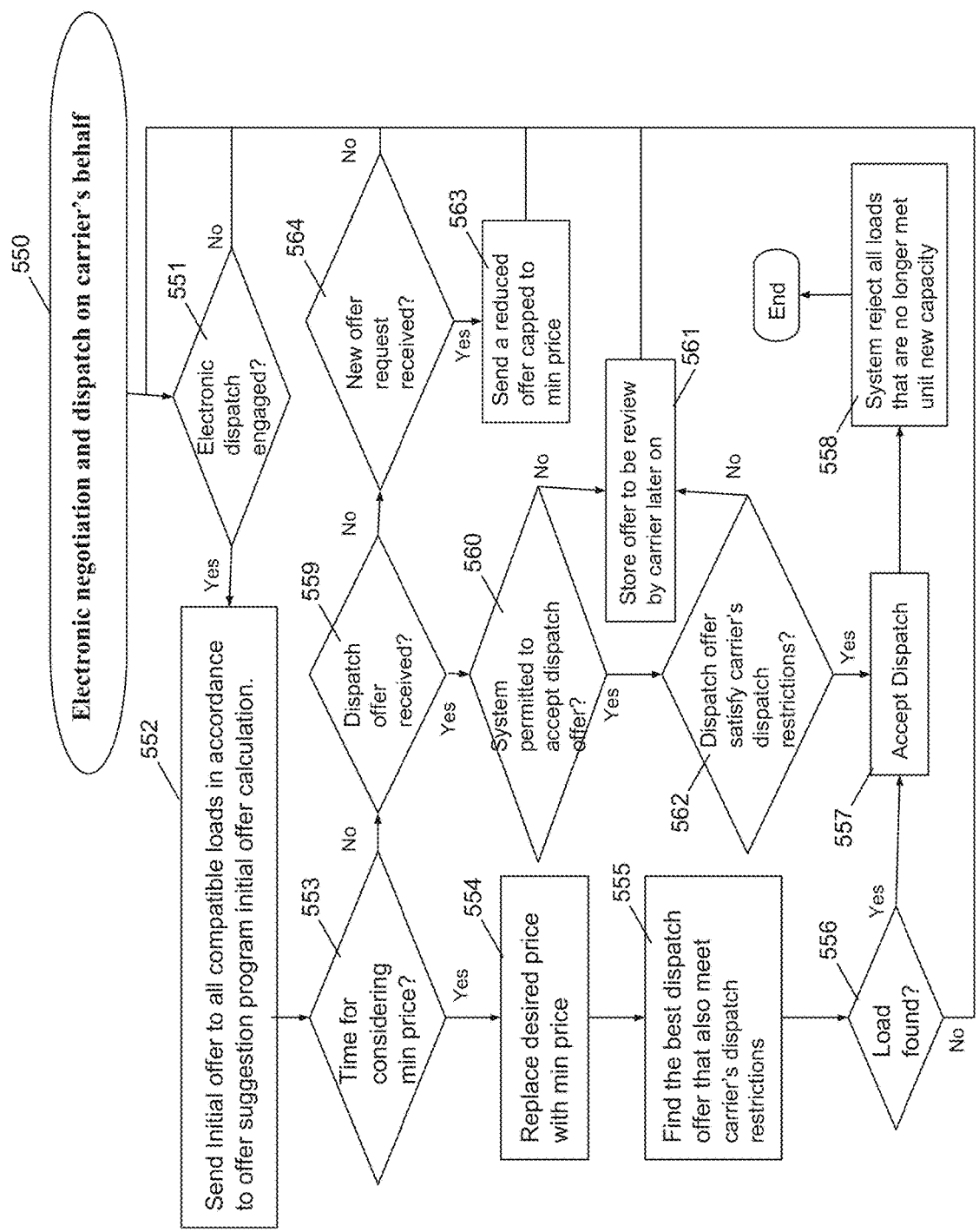
FIG. 24 is a simplified flowchart of an exemplary method of electronic negotiation and dispatch conducted on carrier's behalf.

FIG. 24 is a simplified block diagram for Negotiation and Dispatch Management 550 when conducted on carrier's behalf. When electronic offer management is engaged and the unit's regional time is within electronic offer management activation time 551 system 10 will send offers to all compatible loads 552 for the unit during the process 550. The initial price for an offer is the overall desired price calculated by "Offer Suggestion" for a given load. If carrier has instructed the system 10 to consider unit's min price for dispatch process, system 10 check whether the corresponding timer has expired 553. If that is the case, system 10 replace the desired price with the min price 554 and immediately review the list of stored dispatch offer to find the best offer which meet carrier's dispatch restrictions 555. If such offer found 556 system 10 proceed by accepting the dispatch offer for that load 557 and performs maintenance task such as rejecting all loads that no longer meet unit's remaining capacity 558. Otherwise system 10 resume its normal operation by waiting for new events such as new dispatch offer 559 or new offer request 564. If a dispatch offer is received 559 and system 10 is permitted to accept dispatch offers 560 system 10 check to determine whether said dispatch offer satisfy all of carrier's dispatch restriction 562. If that is the case system 10 accept the dispatch offer 557 and perform required maintenance tasks 558. Otherwise system 10 will record the dispatch offer 561 to be reviewed at later time. When shipper requests a new offer 564 system 10 send a reduced offer 563 by subtracting the predefined reduction price per rejection from previous offer based on the guideline specified in "Offer Suggestion". The reduced offer is always capped at carrier min price. If the min price for a given transport-unit is already reached, min price will be resubmitted again. In that case system will not permit shippers to send a new offer request for that load to said transport-unit. When a transport-unit responds to a load's offer request and the unit's offer is the lowest offer in its category, shippers could send new offer request to rest of transport units in that category for that load. If the unit with lowest offer in the category rejects the load, system 10 will restore offer of carriers' who re-submitted a reduced offer due to said void offer.

As stated earlier carriers could instruct the system 10 to accept any dispatch offer equal or above unit's desired price as long as it meets the dispatch restriction requirement on a first-come-first-served basis. In case unit receives multiple dispatch offers with same dollar per mile price (i.e. when system reviewing the offers below carries desired price for choosing the best candidate or if unit is situated in a busy location), system 10 will give priority to offers with larger grand total and less weight and dimension and then invoke rest of carrier's preference defined for such case like favoring loads with no tarp, favoring loads going to east rather than west, better destination transport-unit to load ratio, etc.

Security: In addition to providing shipper 11 with detailed information about the dispatched transport-unit 15, (i.e. tractor, trailer and driver data, onboard device 16 identification code) system 10 issues a unique security code to carrier 14 to be presented to shipper 11 at pickup location once a transport-unit 15 is dispatched. System also defines a geo-fence perimeter around load's pick up or drop off location as soon as a unit is dispatched which is used to notify the shipper when the dispatched transport unit enters or exits said perimeter. For further security shipper could check the unit's GPS identification code with what is shown on actual onboard device of the unit. As soon as shipper or carrier update load status to "Picked Up" system check onboard GPS position to verify whether the same onboard device 16 that accepted the load 12 was present at pickup or drop off location and otherwise warn the relevant users. This approach also help system to detect parties who represent themselves as carriers 14 to acquire a load 12 only to brokerage said load 12 to other carriers 14. Another set of code is issued to shippers 11 and/or consignees 23 to be presented to carriers 14 upon satisfactory load delivery. By receiving and entering such code, carrier 14 could finalize the load delivery transaction to protect himself 14 from future claims if such load 12 is damaged after drop off. Such code is also used by consignee 23 to track the status and movement of that particular load 12 and allow access to dispatched transport-unit 15 information without constantly depending on shipper 11 for such information. Carrier 14 could post a load damage claim when transport-unit is present at load's pickup location. However if unit exits the geo-fence perimeter around the pickup location carrier is no longer permitted to post a claim or alter a posted claim. Upon submission of such claim system immediately capture the identification of the onboard device 16, device location, time and the user name who posted the report. Similarly as long as the unit is present at load drop off location shipper or consignee can post a load damage claim. However when the unit exits the geo-fence perimeter around load drop off location they are no longer permitted to post a claim or alter an already posted claim. The geo-fence perimeter is the smallest possible radius defined by system 10 which is dictated by the available accuracy of the unit's onboard GPS device.

Staff Permission: Carriers could optionally designate officer(s) and assign one or more transport-units to each officer. Each officer is given full control and authority to manage the activities of transport-unit(s) under his control on carrier's behalf. Said officers could reside in office or be present onboard a transport-unit since load matching and assignment could be conducted from office, on-board the unit or a combination of both approach. Same is true for shippers. Users could also assign different permission-levels for their staff depending on the level of experience and trust. For example a carrier could authorize or prohibit a driver to acquire loads. In latter case only staff in the office could secure load for such driver and the driver can only partake in later steps required by freight management.

Delay Forecast Analyzer is designed to assist shippers and carriers to predict potential delays for upcoming load pick up or drop off deadlines prior to or after dispatching process by informing users ahead of time in case such delays are detected. Users could further instruct the system 10 to use delay prediction information to block visibility and access of units that do not comply with load's pickup, load's delivery or both condition. User could also make an offer contingent upon if the unit meets load pick up, drop off or both deadline. In that case system withdraw the offer on user's behalf if system detects an unrecoverable delay greater than a predefined value set by user. Unrecoverable delays are delays that cannot be compensated by transport-unit under ideal conditions and will definitely result in untimely pickup or delivery of the load. System is able to perform such predictions by receiving drivers' available hours of service for a unit, unit's current location, unit dispatch speed as well as live traffic and navigation data related to pickup and delivery of the load. Such data could be provided by third parties (i.e. Google, EOBR system, etc.) or come from in-house database. Calculating the number of hours each unit driver can legally drive per 24 hours, average legal speed limit of fastest route to load's pick up or destination and unit dispatch speed etc., analyzer computes the distance unit can travel per every 24 hours and thus calculate unit's arrival time. If unit's predicted arrival time exceeds the load deadline analyzer notifies the appropriate user. After a load is dispatched delay forecast analyzer periodically recalculates the minimum driving time based on the fastest route from unit's current location to load destination to detect and warn user of any potential unrecoverable delay as explained above. As a simplistic example let's assume load deadline is within next 48 hours, load delivery distance is calculated to be 2200 miles requiring 40 hours of nonstop driving according to Google fastest route and unit has a single driver with 48 hours of legal driving time in next 7 days. In this scenario even though the unit driver's legal remaining hours of service exceeds the calculated 40 hours of traveling time, however according to Department of Transportation hour of service regulation the driver is only allowed to drive 11 hours per 24 hours. Hence in the best case scenario the driver could only drive 22 hour within load 48 hours window deadline. Therefore forecast system notifies the user of the predicted unrecoverable delay for delivery. This example is only one variation of how the system can detect delays by considering driver hours of service and fastest route driving hours. However, system further considers additional factors such as traffic updates, unit dispatch speed, average speed of individual road sections of the fastest route, speed limit and any other available and applicable data to calculate a more accurate predictions.

The invention claimed is:

1. A computer system method of optimizing matching and dispatch of cargo and transport-unit based on individual transport-unit and its elements quality comprising:

creating and activating a plurality of carrier accounts and respective transport-unit accounts based on carrier information and creating a plurality of shipper accounts and respective loads based on shipper information and a network to connect the accounts to at least one server;

activating a carrier account comprising:
 the carrier having at least one transport-unit-element under the carrier account;
 and the carrier having an active transport-unit;
 the carrier having at least one transport-unit-element under the carrier account comprising:
  a user registering a transport-unit-element in the system by providing the element's unique identifier and the system creating an account and a quality database for the transport-unit-element separate from any carrier account;
  the system receiving a request to transfer the transport-unit-element under the carrier account; and
  the system transferring the transport-unit-element under the carrier account;
 the carrier having an active transport-unit comprising:
  the carrier creating a transport-unit account under the carrier account;
  the system receiving a request to transfer a transport-unit-element under the transport-unit account; and
  the system registering the transport-unit by transferring the transport-unit-element under the transport-unit account;

the system conforming to set of rules to optimize matching and dispatch;
 the system conforming to set of rules to optimize matching comprising:
  the system matching compatible transport-units and loads according to the system compatibility requirement; and
  the system enabling a shipper with a compatible load to access the quality database of the transport-unit's element that is matched to the load;
 the system conforming to set of rules to optimize dispatch comprising:
  the system executing rules (a), (b), (c), (d)
  (a) preventing the carrier account from sending direct offer to the shipper account for a load
  (b) enforcing the carrier's offer for a load to be sent form the carrier's matched transport-unit account, otherwise apply rule (a)
  (c) comparing each matched transport-unit and load response to an offer with the system dispatch requirement
  (d) dispatch a matched transport-unit and load when the matched transport-unit and load response complies with the system dispatch requirement, and the system updating the server, otherwise apply rule (c).

2. The method of claim 1 wherein the system creating an account and a quality database for the transport-unit-element separate from any carrier account further comprising the system determining the transport-unit-element's quality according to the system measurement of the element's dynamic performance.

3. The method of claim 2 further comprising the system determining the transport-unit's quality according to the weighted combination of all its relevant elements' qualities.

4. The method of claim 3 further comprising the system determining the carrier's quality according to the weighted combination of all its relevant transport-units' qualities.

5. The method of claim 2 further comprising the system dynamically adjusting the overall quality of the transport-unit in accordance to its current associated unit-elements.

6. The method of claim 1 wherein the system conforming to set of rules to optimize dispatch further comprising the system monitoring the change of transport-unit's identifiable elements when the unit is dispatched to the load's pickup or drop-off location.

7. The method of claim 1 wherein the system conforming to set of rules to optimize dispatch further comprising the system notifying the relevant user if the designated dispatched transport-unit is not the same unit when the load's status is changed to picked up or dropped off.

8. The method of claim 7 further comprising the system identifying which element of the dispatched transport-unit was not present at the load's pick up or drop-off and notifying the user.

9. The method of claim 1 wherein the system registering the transport-unit account further comprising the system transferring the transport-unit-element under a different transport-unit account and applying the change to the affected accounts.

10. The method of claim 9 further comprising the system transferring the transport-unit-element's quality; and the system applying the adjustment for the affected transport-units.

11. The method of claim 9 further comprising the system transferring the transport-unit-element under a transport-unit of a different carrier; the system transferring the element's quality; and the system applying the adjustment for the affected accounts.

12. The method of claim 1 wherein the system conforming to set of rules to optimize matching further comprising the system receiving a request to assign a tag to an account; the system assigning the tag to the account; and the system enforcing the assigned tag for the requesting account and the tagged account.

13. The method of claim 12 further comprising the system assigning a shipper-favorite-tag to a transport-unit or a transport-unit-element.

14. The method of claim 13 further comprising the system assigning a favorability level to the tagged favorite-item.

15. The method of claim 12 further comprising the system assigning a shipper-rejected-tag to a transport-unit or a transport-unit-element.

16. The method of claim 12 further comprising the system considering the assigned tag to determine the compatibility of transport-units and loads.

17. The method of claim 16 further comprising the system considering the transport-unit-element's assigned tag after the element is transferred.

18. The method of claim 17 further comprising the system enforcing the element's assigned tag for the account that the element is transferred to.

19. The method of claim 17 further comprising the system no longer enforcing the element's assigned tag for the account that the element is transferred from.

20. The method of claim 16 further comprising the system considering transport-units of a carrier account that has been assigned a shipper-rejected-tag not compatible to the shipper's loads.

21. The method of claim 16 further comprising the system considering a transport-unit containing an element with assigned shipper-rejected-tag not compatible to the shipper's loads.

22. The method of claim 12 further comprising the system receiving a request to withdraw the assigned tag from the account; the system disregarding the request when the request is received from an account that has not initiated the tag assignment, otherwise the system withdrawing the tag; and updating the server.

23. The method of claim 1 wherein the system conforming to set of rules to optimize matching further comprising the system comparing a matched transport-unit and load against the carrier and shipper preference settings to determine the compatibility of the transport-unit and the load.

24. The method according of claim 1 wherein the system performing compatibility further comprising the system revoking the compatibility link between the load and the transport-unit when the transport-unit is located outside of advertisement area defined for said load by the shipper.

25. The method of claim 1 wherein the system performing compatibility further comprising the system revoking the compatibility link between the transport-unit and the load when the load is located outside of advertisement area defined for said transport-unit by the carrier.

26. The method of claim 1 wherein the system conforming to set of rules to optimize dispatch further comprising the system receiving a request and instruction to assign a condition to an offer; the system assigning the condition to the offer according to the instruction; and the system enforcing the condition according to the condition parameter instruction.

27. The method of claim 26 further comprising the system modifying the offer after the assigned condition parameter is no longer satisfied.

28. The method of claim 27 further comprising the system withdrawing the offer.

29. The method of claim 27 further comprising the system withdrawing the offer when the user has specified a geographical boundary limit condition for the offer and the transport-unit associated with the offer is no longer present within the specified boundary.

30. The method of claim 27 further comprising the system withdrawing the commitment of the offer.

31. The method of claim 1 wherein the system conforming to set of rules to optimize dispatch further comprising the system withdrawing the offer when the transport-unit can no longer comply with the load's deadline.

32. The method of claim 1 wherein the system conforming to set of rules to optimize dispatch further comprising the system receiving a request and instruction to assign a queue order to the transport-unit offers for a load; the system assigning the queue order to the transport-unit offers; and the system awarding dispatch offer to a transport-unit in the queue according to the instruction.

33. The method of claim 32 further comprising the system adjusting the queue order by considering the validity of the queued transport-unit offers.

34. The method of claim 1 wherein the system conforming to set of rules to optimize dispatch further comprising the system preventing the load from requesting an offer from the transport-unit when the transport-unit responded with the same offer price twice.

35. The method of claim 1 wherein the system conforming to set of rules to optimize dispatch further comprising the system preventing the carrier from adjusting a submitted offer for a load until the system receives an instruction from the shipper for the load.

36. The method of claim 1 wherein the system conforming to set of rules to optimize dispatch further comprising the system conforming to set of rules to request an offer on behalf of a shipper for a load from a transport-unit.

37. The method of claim 1 wherein the system conforming to set of rules to optimize dispatch further comprising the system requesting a new offer from the transport-unit on shipper's behalf when the transport-unit's offer is not the lowest received offer for the load, or the offer is above the shipper's max price input for the load.

38. The method of claim 1 wherein the system conforming to set of rules to optimize dispatch further comprising the system accepting a dispatch offer on behalf of a transport-unit when the transport-unit's dispatch settings is met.

39. The method of claim 38 further comprising the system further considering the transport-unit dispatch restrictions.

40. The method of claim 1 wherein the system conforming to set of rules to optimize dispatch further comprising the system accepting a dispatch offer on behalf of the transport-unit when the offer is equal or above the transport-unit's desired price input.

41. The method of claim 1 wherein the system conforming to set of rules to optimize dispatch further comprising the system accepting a dispatch offer below the transport-unit's desired price input when the time-deadline input has expired and the offer price exceeds the transport-unit's minimum price input.

42. The method of claim 1 wherein the system conforming to set of rules to optimize dispatch further comprising the system accepting a dispatch offer on behalf of the transport-unit when the offer price is greater than the transport-unit's price-input and the offer price per miles is greater than the transport-unit's price-per-mile-input.

43. The method of claim 1 wherein the system conforming to set of rules to optimize dispatch further comprising the system accepting a dispatch offer on behalf of the transport-unit when transport-unit-per-load-ratio at the load destination is below the transport-unit's unit-load-ratio-input for the specified transport-unit's time input.

44. The method of claim 1 wherein the system conforming to set of rules to optimize dispatch further comprising the system responding on behalf of a shipper for a load by awarding dispatch offer to a transport-unit when the transport-unit's offer meets the load's dispatch settings.

45. The method of claim 1 wherein the system conforming to set of rules to optimize dispatch further comprising the system sending a dispatch offer to the transport-unit on shipper's behalf for the load when the transport-unit's offer is equal or below the load's desired price input.

46. The method of claim 1 wherein the system conforming to set of rules to optimize dispatch further comprising the system sending a dispatch offer to the transport-unit with the best overall value in all set categories on shipper's behalf for the load.

47. The method of claim 1 wherein the system conforming to set of rules to optimize dispatch further comprising the system sending a dispatch offer to the transport-unit with the best value offer in the next category with highest thresholds when no transport-unit offer is found in the category with the highest thresholds after expiration of the time deadline input.

48. The method of claim 1 wherein the system conforming to set of rules to optimize dispatch further comprising the system sending a dispatch offer on shipper's behalf to the transport-unit tagged as a favorite-item for the load when the transport-unit favorability level and the offer price meets the load's instruction input.

49. The method of claim 1 wherein the system conforming to set of rules to optimize dispatch further comprising the system creating at least one offer category by defining at least one threshold for at least one of the transport-unit Quality-Items.

50. The method of claim 1 wherein the system conforming to set of rules to optimize dispatch further comprising the system placing the transport-unit offer in a category based on the transport-unit's quality and the category's thresholds.

51. The method of claim 1 wherein the system conforming to set of rules to optimize dispatch further comprising the system determining each individual Quality-Item grade for the transport unit offer by comparing the transport-unit quality-item to the associated category thresholds.

52. The method of claim 1 wherein the system conforming to set of rules to optimize dispatch further comprising the system determining Quality-Grade for the transport-unit offer by considering all the transport-unit Quality-Item grades and the relevant weighting factors.

53. The method of claim 1 wherein the system conforming to set of rules to optimize dispatch further comprising the system determining Price-Grade for the transport-unit offer by considering the offer price and the relevant desired price of the offer category.

54. The method of claim 1 wherein the system conforming to set of rules to optimize dispatch further comprising the system determining Value-Grade for the transport-unit offer by considering the offer Quality-Grade, the offer Price-Grade and the respective weighting factors.

55. The method of claim 1 wherein the system conforming to set of rules to optimize dispatch further comprising the system determining the offer with the best overall value among all the categories.

56. The method of claim 1 wherein the system conforming to set of rules to optimize dispatch further comprising the system computing the initial offer price of the transport-unit for the load by considering the transport-unit's geographical directions input and the distance-per-direction input and the distance the load requires to travel in each direction.

57. The method according to of claim 56 further comprising the system applying the transport-unit's price-adjustment-per-distance input to adjust the minimum and the desired price for each direction.

58. The method of claim 56 further comprising determining the overall minimum and the desired price by further considering all the minimum and the desired price per direction.

59. The method of claim 58 further comprising the system initiating the offer on behalf of the transport-unit for the load by sending the overall desired price for the transport-unit.

60. The method of claim 59 further comprising the system adjusting and sending the offer on behalf of the transport-unit to the load according to the transport-unit's deduction input every time the offer is rejected.

61. The method of claim 60 further comprising the system resending the overall minimum price offer on behalf of the transport-unit when further deduction would result in offer price being placed below overall minimum price for the unit.

62. The method of claim 58 further comprising the system adjusting the overall minimum price for the offer by applying the transport-unit's adjustment input for the distance the transport-unit has to travel in any predefined geographical area for the load.

63. The method of claim 58 further comprising the system adjusting the overall minimum price for the offer by applying the transport-unit's destination-unit-to-load ratio input for the load's destination.

64. The method of claim 1 further comprising the system preventing posting a damage claim for the load when the transport-unit has exited the geo-fence perimeter input around the load's pickup location.

65. The method of claim 64 further comprising the system capturing the transport-unit's location, time and the transport-unit's onboard device identifier at the time the load damage claim is posted.

66. The method of claim 64 further comprising the system preventing posting a damage claim for the load once the transport-unit has exited the geo-fence perimeter input around the load's pickup location and has returned to the same perimeter at a later time.

67. The method of claim 1 wherein the carrier having an active transport-unit further comprising the system receiving a request to transfer a registered transport-unit under the carrier account to a different carrier; the system transferring the transport-unit to the requesting carrier account and; the system applying the change to the affected accounts.

68. The method of claim 1 wherein the system conforming to set of rules to optimize dispatch further comprising the system accepting a dispatch offer on behalf of the transport-unit for the load when projected unit: to: load: ratio at the load destination is below the transport-unit's unit-to-load-ratio-input for the set-time-input.

69. The method of claim 1 wherein the system conforming to set of rules to optimize dispatch further comprising the system sending a dispatch offer on shipper's behalf to the transport-unit for the load when the transport-unit offer is equal or below the shipper's desired price in its category.

70. The method of claim 1 wherein the system conforming to set of rules to optimize dispatch further comprising the system sending a dispatch offer on shipper's behalf to the transport-unit with the best overall value in all categories when the desired price is not reached in any of the categories within the set time deadline.

71. The method of claim 1 wherein the system performing compatibility further comprising the system prioritizing the load's offer when the offer's price is greater than the transport-unit's price-input and the offer price per miles is greater than the price-per-mile-input.

72. The method of claim 1 wherein the system enforcing the carrier's offer for a load to be sent form the carrier's matched transport-unit account further comprising the system allow sending offer from one of the transport-unit's associated element on behalf of the transport-unit account.

73. The method of claim 1 wherein a user registering a transport-unit-element in the system further comprising the system preventing user accounts form deleting the registered transport-unit-element or its quality database.

\* \* \* \* \*